United States Patent
Tanaka et al.

(10) Patent No.: US 8,417,882 B2
(45) Date of Patent: *Apr. 9, 2013

(54) STORAGE DEVICE AND DEDUPLICATION METHOD

(75) Inventors: Katsuya Tanaka, Kokubunji (JP); Shuji Nakamura, Machida (JP); Makio Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,678

(22) Filed: Apr. 9, 2012

(65) Prior Publication Data

US 2012/0198139 A1    Aug. 2, 2012

Related U.S. Application Data

(63) Continuation of application No. 12/905,566, filed on Oct. 15, 2010, now Pat. No. 8,156,279, which is a continuation of application No. 12/010,602, filed on Jan. 28, 2008, now Pat. No. 7,818,495.

(30) Foreign Application Priority Data

Sep. 28, 2007  (JP) ................................ 2007-255892

(51) Int. Cl.
*G06F 12/00* (2006.01)

(52) U.S. Cl. . 711/103; 711/159; 711/162; 711/E12.009; 711/E12.003

(58) Field of Classification Search ......................... None
See application file for complete search history.

(56) References Cited

U.S. PATENT DOCUMENTS

| 6,411,546 B1 | 6/2002 | Estakhri et al. |
| 6,928,526 B1 | 8/2005 | Zhu et al. |
| 2007/0038837 A1 | 2/2007 | Ben-Zvi |

FOREIGN PATENT DOCUMENTS

EP    1739565 A1    3/2007

OTHER PUBLICATIONS

Sean Quinlan, et al.; "Venti: a new approach to archival storage", Proceedings of Fast. Conference on File and Storage Technologies, XX, XX, Jan. 28, 2002, pp. 1-13, XP002385754.
EPO Extended European Search Report for Application No./Patent No. 08250569.4-1229, Feb. 2, 2009.

*Primary Examiner* — Charles Rones
*Assistant Examiner* — Baboucarr Faal
(74) *Attorney, Agent, or Firm* — Volpe And Koenig, P.C.

(57) ABSTRACT

This storage device performs deduplication of eliminating duplicated data by storing a logical address of one or more corresponding logical unit memory areas in a prescribed management information storage area of a physical unit memory area defined in the storage area provided by the flash memory chip, and executes a reclamation process of managing a use degree as the total number of the logical addresses used stored in the management information storage area and a duplication degree as the number of valid logical addresses corresponding to the physical unit memory area for each of the physical unit memory areas, and returning the physical unit memory area to an unused status when the difference of the use degree and the duplication degree exceeds a default value in the physical unit memory area.

10 Claims, 13 Drawing Sheets

| LBA | PBA | WRITTEN |
|------|------|---------|
| 0000 | 1000 | 0 |
| 0001 | 1010 | 1 |
| 0002 | 1010 | 1 |

| HASH VALUE | PBA | CONTROL | LBA |
|---|---|---|---|
| 58AB6781 | 1000 | 0 | 0000 |
| 439E27CF | 1010 | 0 | 0001,0002 |

| 83A | 83B | 83C | 83D |

| PBA | USE DEGREE | DUPLICATION DEGREE | UNUSED LOGICAL ADDRESS STORAGE AREA |
|---|---|---|---|
| 1000 | 1 | 1 | 7 |
| 1010 | 3 | 2 | 5 |

| 85A | 85B | 85C | 85D |

84

| 120A | 120B | | UPPER LEVEL CONTROL | | LOWER LEVEL CONTROL | |
|---|---|---|---|---|---|---|
| LU | LBA | | | | | |
| | From | To | AVAILABILITY | SIZE | AVAILABILITY | SIZE |
| 00010000 | 0000 | 3FFF | 1 | 512k | 1 | 64k |
| 00010000 | 5D00 | 87FF | 0 | 0 | 0 | 0 |
| 00010010 | 1010 | EFFF | 1 | 1M | 1 | 128k |

120BA 120BB 120CA 120CB 120DA 120DB

STORAGE DEVICE AND DEDUPLICATION METHOD

CROSS REFERENCE TO RELATED APPLICATIONS

This application is a continuation of U.S. patent application Ser. No. 12/905,566, filed Oct. 15, 2010, which is a continuation of U.S. patent application Ser. No. 12/010,602, filed Jan. 28, 2008, which issued as U.S. Pat. No. 7,818,495 on Oct. 19, 2010, which claims the benefit of Japanese Patent Application No. 2007-255892, filed on Sep. 28, 2007, the contents of each of which are hereby incorporated by reference herein.

BACKGROUND

The present invention generally relates to a storage device and a deduplication method, and in particular to a storage device and a deduplication method that can be suitably applied to a storage device using a flash memory as a storage medium.

Conventionally, with storage devices, random access nonvolatile storage media such as magnetic disks and optical disks have been used as the data storage media. The currently mainstream storage devices comprise a plurality of small disk drives.

In addition, pursuant to the advancement of semiconductor technology in recent years, a collectively erasable nonvolatile semiconductor memory has been developed. A flash memory is a representative example of such a nonvolatile semiconductor memory. A storage device that uses a flash memory as the storage medium is considered to be superior in terms of life span, power consumption and access time in comparison to a storage device comprising numerous small disk drives.

This flash memory is briefly explained below. A block in a flash memory is a storage area of a unit for collectively erasing data, and a page is a unit for reading and writing data. As described later, a plurality of pages are provided in a single block. Due to its characteristic feature, the flash memory is not able to directly rewrite data. In other words, when the flash memory is to rewrite data stored therein, it saves the stored valid data in another block, and then erases the stored data in block units. The flash memory thereafter writes data into the block from which the data was erased.

Specifically, although the flash memory is able to rewrite "1" as "0," it is not able to rewrite "0" as "1." Thus, with a flash memory, all data stored in a block are erased upon rewriting data. Like this, the rewriting of data in a flash memory involves the erasure of data per block. Nevertheless, the time required to erase one block worth of data in a flash memory is roughly several 10 times longer in comparison to the time required to write one page worth of data. Thus, if one block worth of data is erased each time one page worth of data is rewritten, the data rewriting performance of the flash memory will become pessimistically inferior. In other words, when a flash memory is used as the storage medium, it will be necessary to write data using an algorithm capable of hiding the time required to erase data from the flash memory.

In a standard data rewriting operation of a flash memory, a method of adding data to an unused area is adopted, and data is not erased each time data is rewritten. Nevertheless, if the rewriting of data is conducted in succession, the unused area in the flash memory will run low, and it is necessary to erase the unnecessary data written into the flash memory and return the storage area to a reusable state. Thus, a block reclamation process (hereinafter referred to as "reclamation") of copying only valid data in a block containing old data to an unused area and erasing the copy source block to return such block to a reusable state is essential for high speed data rewriting in a flash memory. This reclamation is executed to blocks containing numerous invalid data.

Meanwhile, a flash memory has a limitation on the number of times data can be erased. For instance, an erase count of up to 100,000 times per block is guaranteed. A block with an increased erase count as a result of data rewriting being concentrated therein has a problem of becoming unusable since data can no longer be erased from such block. Thus, when using a flash memory as the storage medium, it is necessary to perform leveling processing of the erase count in order to prevent data erase processing from becoming concentrated on a specific block.

In order to hide the data erase time and level the data erase count as described above, address translation processing from a logical address to a physical address is performed in the flash memory module upon writing data. A flash memory module is configured from one or more flash memory chips and a flash memory controller for controlling the reading and writing of data from and into such flash memory chip. The flash memory controller performs the translation of the logical address and the physical address and, in order to additionally store an address translation table, stores a logical address of a logical block as a logical unit memory area associated with a physical block in a prescribed logical address storage area for each physical block as a physical unit memory area in the flash memory.

Moreover, deduplication technology (also known as data duplication elimination technology) for reducing the capacity cost of storage devices is also attracting attention. Deduplication technology is technology for associating a plurality of logical blocks storing identical data with one physical block storing such data, and enables the economization of the storage data capacity (refer to U.S. Pat. No. 6,928,526). According to this deduplication technology, since it is possible to reduce the data rewriting count, the life span of the flash memory can be prolonged by applying such deduplication technology to a storage device using a flash memory as the storage medium.

SUMMARY

Meanwhile, when applying the deduplication technology to a storage device using a flash memory as the storage medium, it is necessary to store the logical address of each logical block associated with a physical block for each such physical block.

Nevertheless, since the logical address storage area of each physical block is limited, the capacity of the logical address storage area will run short when numerous logical addresses are written into the logical address storage area. In addition, since a flash memory is a storage medium that is not able to overwrite data, invalid logical addresses will increase if data update is repeated to a physical block with duplicated data, and the deduplication efficiency will deteriorate.

Thus, when applying the deduplication technology to a storage device using a flash memory as the storage medium, it is necessary to conveniently erase the invalid logical addresses stored in the logical address storage area of the respective physical blocks. If this can be realized, it may be possible to effectively prevent the degradation of duplication efficiency and improve the space efficiency of the flash memory while seeking a longer operating life of the flash memory.

Meanwhile, the foregoing deduplication is performed for each management unit of a storage area in the flash memory. For instance, with a storage device equipped with a plurality of flash memory modules respectively mounted with a plurality of flash memory chips, the foregoing deduplication processing will be performed independently for each flash memory module.

Nevertheless, the duplication of data occurs not only in the flash memory modules, and the duplication of data also occurs between the flash memory modules. Thus, if the duplication of data between the flash memory modules can be eliminated, the deduplication efficiency can be improved even further.

The present invention was devised in view of the foregoing points. Thus, an object of this invention is to provide a storage device and a deduplication method capable of improving the space efficiency of a flash memory while seeking a longer operating life of the flash memory as a storage medium. Another object of this invention is to provide a storage device and a deduplication method capable of further improving the deduplication efficiency.

In order to achieve the foregoing objects, the present invention provides a storage device equipped with one or more flash memory modules. The flash memory module comprises at least one flash memory chip for providing a storage area, and a controller for controlling the reading and writing of data from and into the flash memory chip. The controller performs deduplication of eliminating duplicated data by storing a logical address of one or more corresponding logical unit memory areas in a prescribed management information storage area of a physical unit memory area defined in the storage area provided by the flash memory chip, and executes a reclamation process of managing a use degree as the total number of the logical addresses used stored in the management information storage area and a duplication degree as the number of valid logical addresses corresponding to the physical unit memory area for each the physical unit memory area, and returning the physical unit memory area to an unused status when the difference of the use degree and the duplication degree exceeds a prescribed value in the physical unit memory area.

The present invention additionally provides a storage device comprising a plurality of flash memory modules for providing a storage area, and a storage controller for controlling the reading and writing of data from and into the plurality of flash memory modules. The storage controller reads and writes data from and into the plurality of flash memory modules by partitioning the data in a prescribed unit, and performs deduplication processing to data of a data size that is equal or greater than the prescribed unit for eliminating duplicated data to an extent across the plurality of flash memory modules. The plurality of flash memory modules perform deduplication processing to data of a data size that is equal or less than the prescribed unit for each flash memory module.

The present invention further provides a deduplication method of eliminating duplication of data in a storage device equipped with one or more flash memory modules having at least one flash memory chip for providing a storage area. This deduplication method comprises a first step of performing deduplication processing by storing a logical address of one or more corresponding logical unit memory areas in a prescribed management information storage area of a physical unit memory area defined in the storage area provided by the flash memory chip, and managing a use degree as the total number of the logical addresses used stored in the management information storage area and a duplication degree as the number of valid logical addresses corresponding to the physical unit memory area for each the physical unit memory area, and a second step of executing a reclamation process of returning the physical unit memory area to an unused status when the difference of the use degree and the duplication degree exceeds a prescribed value in the physical unit memory area.

The present invention additionally provides a deduplication method of eliminating duplication of data in a device comprising a plurality of flash memory modules for providing a storage area, and a storage controller for controlling the reading and writing of data from and into the plurality of flash memory modules. This deduplication method comprises a first step of the storage controller reading and writing data from and into the plurality of flash memory modules by partitioning the data in a prescribed unit, and performing deduplication processing to data of a data size that is equal or greater than the prescribed unit for eliminating duplicated data to an extent across the plurality of flash memory modules, and a second step of the plurality of flash memory modules performing deduplication processing to data of a data size that is equal or less than the prescribed unit for each flash memory module.

According to the present invention, it is possible to effectively utilize a flash memory while seeking a longer operating life of the flash memory as a storage medium. The present invention is also capable of further improving the deduplication efficiency.

DESCRIPTION OF DRAWINGS

FIG. 10 is a conceptual diagram explaining a hash value management table;

FIG. 11 is a conceptual diagram explaining a physical block management table;

DETAILED DESCRIPTION

An embodiment of the present invention is now explained in detail with reference to the attached drawings.

(1) First Embodiment

Figure 1:
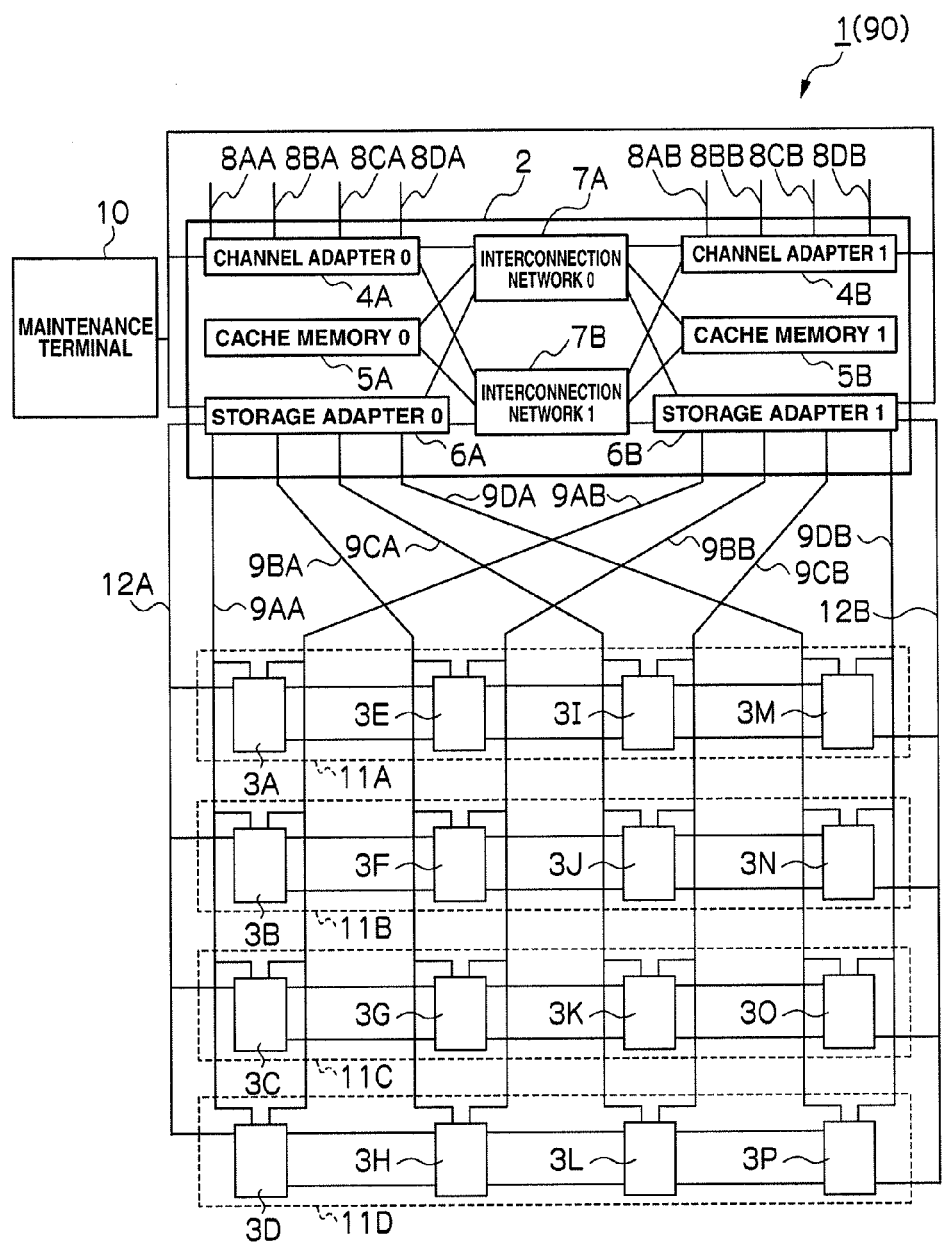
FIG. 1 is a block diagram showing the configuration of a storage device according to the first to fifth embodiments of the present invention.

FIG. 1 shows the configuration of a storage device 1 according to the first embodiment. The storage device 1 is configured from a plurality of flash memory modules 3A to 3P that respectively provide a storage area, and a storage controller 2 that controls the reading and writing of data from and into the flash memory modules 3A to 3P.

The storage controller 2 comprises channel adapters 4A, 4B, cache memories 5A, 5B, storage adapters 6A, 6B, and interconnection networks 7A, 7B. Although FIG. 1 shows a case where two channel adapters 4A, 4B, two cache memories 5A, 5B and two storage adapters 6A, 6B are provided, these components may be provided in a quantity of one each or three or more.

The interconnection networks 7A, 7B are configured from a switch or the like to mutually connect the channel adapter 4A, the cache memory 5A and the storage adapter 6A, and to mutually connect the channel adapter 4B, the cache memory 5B and the storage adapter 6B.

The channel adapter 4A is connected to an external host system not shown via channels 8AA to 8DA. Similarly, the channel adapter 4B is connected to an external host system via channels 8AB to 8DB. Specifically, the host system is a computer that reads and writes data from and into the storage device 1 of the present embodiment.

The cache memories 5A, 5B are used for temporarily storing data received from the channel adapters 4A, 4B and the storage adapters 5A, 5B.

The storage adapter 6A is connected to the respective flash memory modules 3A to 3P via channels 9AA to 9DA, and is able to access the intended flash memory module 3A to 3P via the corresponding channel 9AA to 9DA. Specifically, the storage adapter 6A is connected to the flash memory modules 3A to 3D via the channel 9AA, and connected to the flash memory module 3E to 3H via the channel 9BA. The storage adapter 6A is also connected to the flash memory modules 3I to 3L via the channel 9CA, and connected to the flash memory modules 3M to 3P via the channel 9DA.

Similarly, the storage adapter 6B is connected to the respective flash memory modules 3A to 3P via channels 9AB to 9DB, and is able to access the intended flash memory module 3A to 3P via the corresponding channel 9AB to 9DB. Specifically, the storage adapter 6B is connected to the flash memory modules 3A to 3D via the channel 9AB, and connected to the flash memory modules 3E to 3H via the channel 9BB. The storage adapter 6B is also connected to the flash memory modules 3I to 3L via the channel 9CB, and connected to the flash memory modules 3M to 3P via the channel 9DB.

The channel adapters 4A, 4B and the storage adapters 6A, 6B are connected to a maintenance terminal 10. The maintenance terminal 10 is a computer device comprising information processing resources such as a CPU (Central Processing Unit) and a memory. The maintenance terminal 10 sends the configuration information input by the administrator of the storage device 1 to the channel adapters 4A, 4B and/or the storage adapters 6A, 6B.

Incidentally, in substitute for the channel adapter 4A and the storage adapter 6A, a single adapter comprising the functions of the channel adapter 4A and the storage adapter 6A may also be provided.

Reference numbers 11A to 11D represent RAID (Redundant Arrays of Inexpensive Disks) groups. For instance, a RAID group 11A is configured from the flash memory modules 3A, 3E, 3I, 3M. If an error occurs in one of the flash memory modules 3A, 3E, 3I, 3M (for instance, the flash memory module 3A) belonging to the RAID group 11A and data cannot be read therefrom, data stored in the defective flash memory module 3A can be recovered based on related data stored in the other flash memory modules 3E, 3I, 3M belonging to the same RAID group 11A.

The flash memory modules 3A to 3P are connected to the storage adapter 6A via the network 12A, and connected to the storage adapter 6B via the network 12B. The storage controller 2 and the flash memory modules 3A to 3P mutually communicate information and the like for performing deduplication via the networks 12A, 12B.

Figure 2:
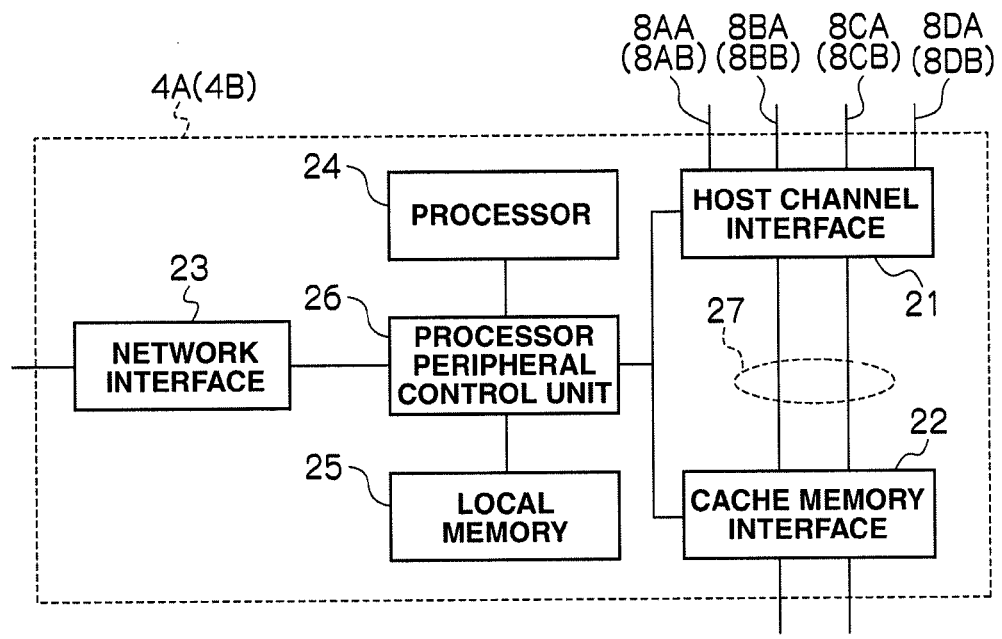
FIG. 2 is a block diagram showing the configuration of a channel adapter according to the first to fifth embodiments.

FIG. 2 shows the configuration of the channel adapters 4A, 4B. As shown in FIG. 2, the channel adapters 4A, 4B comprise a host channel interface 21, a cache memory interface 22, a network interface 23, a processor 24, a local memory 25, and a processor peripheral control unit 26.

The host channel interface 21 is an interface for communicating with the host system via the channels 8AA to 8DA, 8AB to 8DB, and mutually converts the data transfer protocol of the channels 8AA to 8DA, 8AB to 8DB and the data transfer protocol in the storage controller 2. The cache memory interface 22 is an interface for the interconnection networks 7A, 7B, and the network interface 23 is an interface for communicating with the maintenance terminal 10. The host channel interface 21 and the cache memory interface 22 are connected via a signal line 27.

The processor 24 is a processor for governing the overall operational control of the channel adapters 4A, 4B, and performs various types of control processing based on programs stored in the local memory 25. For example, the processor 24 controls the data transfer between the host system and the interconnection networks 7A, 7B.

The local memory 25 stores programs and tables to be executed or referred by the processor 24. These tables can be set or changed by the administrator. Here, the administrator inputs information for setting or changing tables in the maintenance terminal 10. The maintenance terminal 10 sends the input information to the processor 24 via the network interface 23. The processor 24 creates or changes the tables based on the received information, and stores the created or changed tables in the local memory 25.

The processor peripheral control unit 26 controls the data transfer among the host channel interface 21, the cache memory interface 22, the network interface 23, the processor 24, and the local memory 25. The processor peripheral control unit 26 is configured from a chipset or the like.

Figure 3:
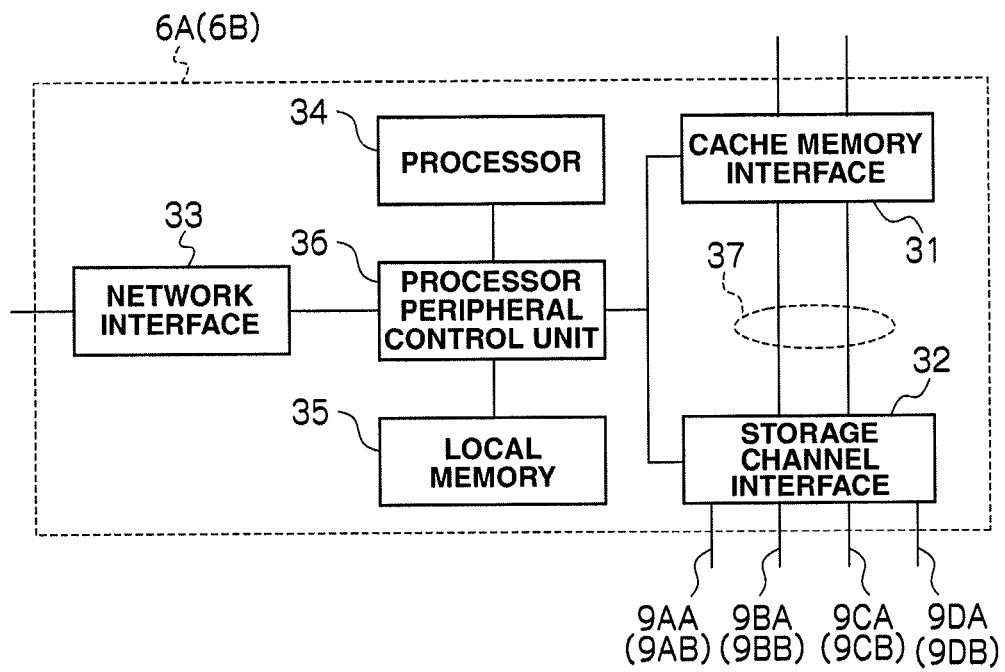
FIG. 3 is a block diagram showing the configuration of a storage adapter according to the first to fifth embodiments.

FIG. 3 shows the configuration of the storage adapters 6A, 6B. As shown in FIG. 3, the storage adapters 6A, 6B comprise a cache memory interface 31, a storage channel interface 32, a network interface 33, a processor 34, a local memory 35, and a processor peripheral control unit 36.

The cache memory interface 31 is an interface for connecting the storage adapters 6A, 6B to the interconnection network 7A, 7B. The storage channel interface 32 is an interface for connecting the storage adapters 6A, 6B to the channels 9AA to 9DA, 9AB to 9DB, and mutually converts the data transfer protocol of the channels 9AA to 9DA, 9AB to 9DB and the data transfer protocol in the storage controller 2. The cache memory interface 31 and the storage channel interface 32 are connected via a signal line 37.

The network interface 33 is an interface for connecting the storage adapters 6A, 6B to the maintenance terminal 10 and the flash memory modules 3A to 3P.

The processor 34 is a processor for governing the overall operational control of the storage adapters 6A, 6B, and performs various types of control processing based on programs stored in the local memory 35. For example, the processor 34 controls the data transfer between the respective flash memory modules 3A to 3P and the interconnection networks 7A, 7B.

The local memory 35 stores programs and tables to be executed or referred by the processor 34. These tables can be set or changed by the administrator. Here, the administrator inputs information for setting or changing tables in the maintenance terminal 10. The maintenance terminal 10 sends the input information to the processor 34 via the network interface 33. The processor 34 creates or changes the tables based on the received information, and stores the created or changed tables in the local memory 35.

The processor peripheral control unit 36 controls the data transfer among the cache memory interface 31, the storage channel interface 32, the network interface 33, the processor 34, and the local memory 35. The processor peripheral control unit 36 is configured from a chipset or the like.

Figure 4:
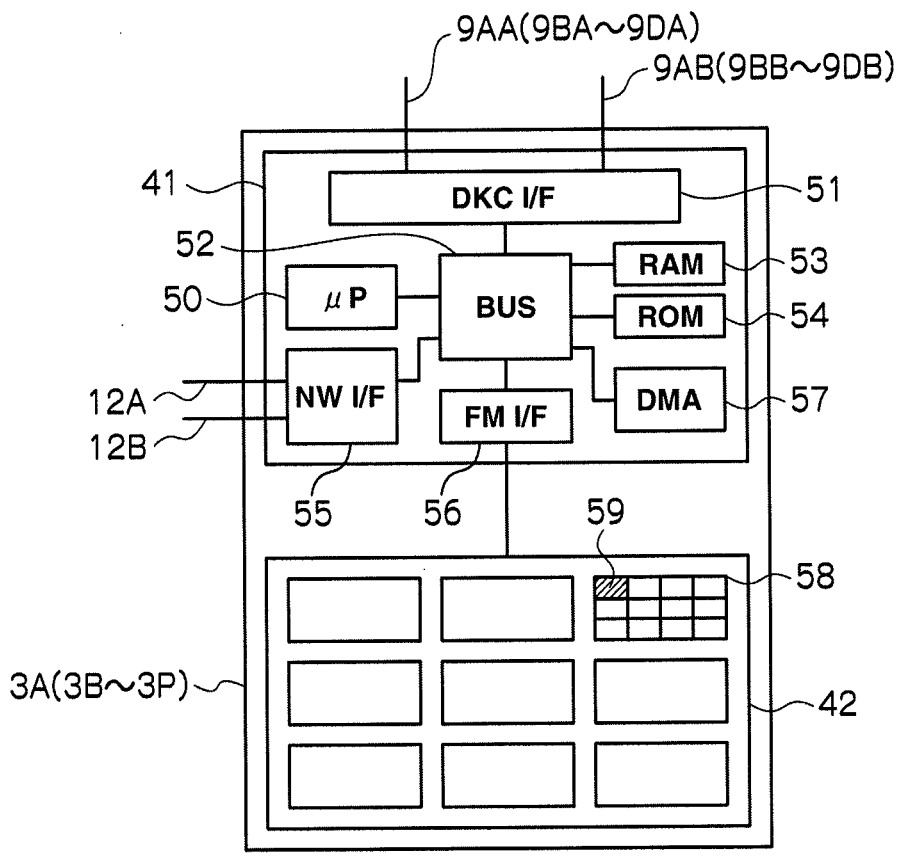
FIG. 4 is a block diagram showing the configuration of a flash memory module according to the first to fifth embodiments.

FIG. 4 shows the configuration of the flash memory modules 3A to 3P. The flash memory modules 3A to 3P comprise a flash memory controller 41 and a flash memory 42. The flash memory 42 is a nonvolatile storage medium for storing data, and the flash memory controller 41 performs control processing for reading or writing data from or into the flash memory 42 or erasing the data stored in the flash memory 42.

The flash memory controller 41 comprises a processor 50, an interface unit 51, an internal bus 52, a RAM (Random Access Memory) 53, a ROM (Read Only Memory) 54, a network interface 55, a flash memory interface unit 56, and a data transfer unit 57.

The flash memory 42 is configured from a plurality of flash memory chips 58. A plurality of physical blocks 59 are comprised in the storage area provided by the flash memory chips 58, and data is stored in such physical blocks 59. A block 59 is a unit for erasing data with the memory controller 41.

The interface unit 51 is connected to the storage adapter 6A in the storage controller 2 via the channels 9AA to 9DA, and connected to the storage adapter 6B in the storage controller 2 via the channels 9AB to 9DB. The interface unit 51 sends and receives data and commands (for instance, a SCSI command) to and from the storage adapter 6A and the storage adapter 6B via the channels 9AA to 9DA, 9AB to 9DB.

For example, the interface unit 51 receives data sent from the storage adapter 6A or the storage adapter 6B via the channels 9AA to 9DA, 9AB to 9DB, and stores the received data in the RAM 53. The interface unit 51 also sends the data stored in the RAM 53 to the storage adapter 6A or the storage adapter 6B via the channels 9AA to 9DA, 9AB to 9DB.

The RAM 53 is configured from an SRAM (Static RAM) or a DRAM (Dynamic RAM) enabling the high speed reading and writing of data, and is used for temporarily storing data to be sent and received by the interface unit 51. The ROM 54 is configured from a nonvolatile memory, and stores programs to be executed by the processor 50. These programs are copied from the ROM 54 to the RAM 53 when the storage device is powered on so that such programs can be executed by the processor 50.

The RAM 53 also stores tables to be referred to by the processor 50. An example of such a table is an address translation table of a logical address and a physical address of the flash memory 42. A logical address is an address for accessing the flash memory 42 from outside the flash memory modules 3A to 3P (for instance, from the storage adapters 6A, 6B), and a physical address is an address used by the flash memory controller 41 to access the flash memory 42.

The internal bus 52 mutually connects the processor 50, the interface unit 51, the RAM 53, the ROM 54, the network interface 55, the data transfer unit 57 and the flash memory interface unit 56, and functions as a data transfer path.

The network interface 55 controls the communication between the flash memory controller 41 and the storage controller 2. The network interface 55 is connected to the storage adapters 6A, 6B via the networks 12A, 12B.

The flash memory interface unit 56 is an interface for connecting the flash memory controller 41 and the flash memory 42.

The data transfer unit 57 controls the data transfer between the interface unit 51 and RAM 53 and the flash memory 42 according to a command from the processor 50. When the processor 50 is to execute the functions of the data transfer unit 57, the data transfer unit 57 may be omitted.

The processor 50 governs the overall operational control of the flash memory modules 3A to 3P, and performs various types of control processing based on programs copied to the RAM 53. For example, the processor 50 refers to the address translation table of the logical address and physical address of the flash memory 42 copied to the RAM 53, and reads and writes data from and into the flash memory 42. The processor 50 also performs reclamation processing (block reclamation process) and wear-leveling processing (erase count leveling processing) to the blocks 59 in the flash memory modules 3A to 3P.

Figure 5:
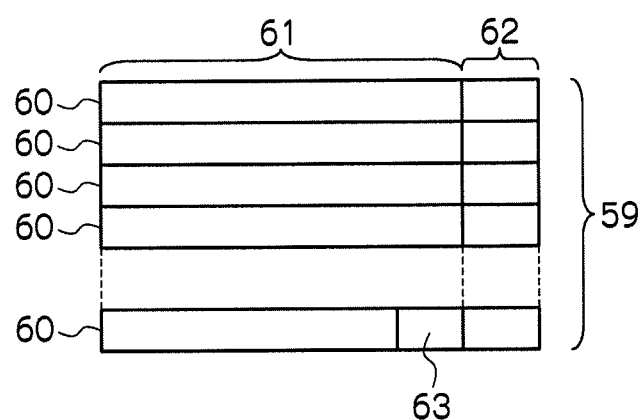
FIG. 5 is a conceptual diagram explaining the block configuration of a flash memory module according to the first to fifth embodiments.

FIG. 5 shows the configuration of the blocks 59 comprised in the storage area of the flash memory chip. As shown in FIG. 5, the block 59 is configured from several ten (64 for instance) pages 60.

As described above, a page 60 is a unit used by the flash memory controller 41 to read and write data from and into the flash memory chip 58. For example, in the case of a NAND (Not AND) flash memory, the flash memory controller 41 reads data at a speed of roughly 20 to 30 μs per page, and writes data at a speed of 0.2 to 0.3 ms per page. In addition, the flash memory controller 41 erases data at a speed of 2 to 4 ms per block.

The page 60 is configured from a data section 61 as an area for storing normal data, and a redundant section 62 as an area for storing the page management information and error correcting code of that page 60. For example, the capacity per page is 2112 bytes, and, among such 2112 bytes, 2048 bytes are set in the data section and 64 bytes are set in the redundant section 62.

The page management information contains an offset address and a page status. The offset address is a relative address of the page 60 in the corresponding block 59. The page status represents whether the page 60 is a valid page, an invalid page, an unused page or a page in processing.

The error correcting code is information for detecting and correcting the error of the page 60, and a Hamming code or the like is used as such error correcting code. The error correcting code is created by the processor 50 executing the programs stored in the RAM 53 or the ROM 54.

Normally, the redundant section 62 can only be accessed by the flash memory controller 41. Thus, only the data section 61 is an area that is accessible from the storage adapters 6A, 6B. In other words, it could be said that the logical address is mapped to the memory space of the data section 61.

The block 59 has a management information storage area 63 in a prescribed memory location. The management information storage area 63 is an area for storing the management information of the logical address or the like associated with the physical address in the block 59. Thus, the capacity obtained by subtracting the management information storage area 63 from the total data section 61 of the pages 60 belonging to the block 59 will be the storable data capacity of the storage controller 2 per block of the flash memory modules 3A to 3P.

In order to simplify the explanation in the present embodiment, the access unit for reading and writing data from and into the flash memory modules 3A to 3P will be the storable capacity of the flash memory 42 per block. In other words, the storage controller 2 reads and writes data from and into the flash memory modules 3A to 3P according to the data storage capacity unit in the block 59 of the flash memory 42.

Figure 6:
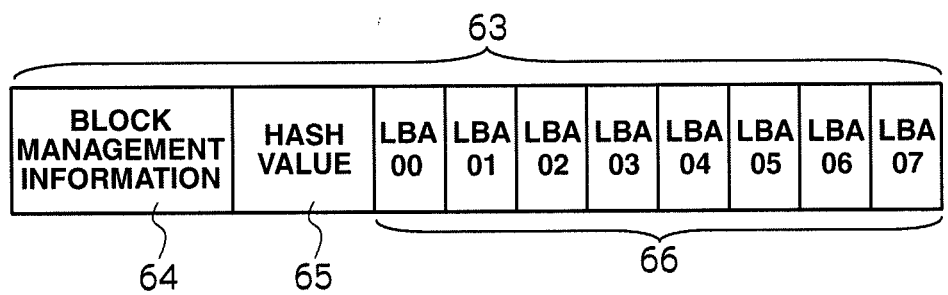
FIG. 6 is a conceptual diagram explaining a management information storage area in a physical block.

FIG. 6 shows the configuration of the management information storage area 63. As evident from FIG. 6, the management information storage area 63 is configured from a block management information storage area 64, a hash value storage area 65, and a logical address storage area 66.

The block management information storage area 64 stores information showing the current erase count of the block 59 and the status (valid, invalid, unused or written) of the block 59.

The hash value storage area 65 stores the hash value as information for identifying the data written into the block 59. The hash value may be created with the storage controller 2, or created with the processor 50 in the flash memory modules 3A to 3P.

When creating the hash value with the storage controller 2, the storage controller 2 sends the created hash value, together with the write data, to the flash memory modules 3A to 3P. According to this method, there is an advantage in that load of the processor 50 can be reduced. When creating the hash value in the flash memory modules 3A to 3P, the hash value is created using some kind of means that creates an error correcting code in the flash memory modules 3A to 3P. According to this method, there is an advantage in that the channel load between the storage controller 2 and the flash memory modules 3A to 3P can be reduced.

The logical address storage area 66 stores the logical address of the logical block associated with the block 59. In the foregoing case, the storage device 1 of this embodiment is equipped with a deduplication function, and up to 8 logical blocks can be associated with a single physical block (block 59) according to the deduplication function. In the case of this embodiment, up to 8 logical addresses (LBA 00 to LBA 07) of the logical blocks associated with the block 59 can be stored in the logical address storage area 66.

The information to be stored in the logical address storage area 66 may be information other than the logical address so as long as it is information that can used to identify the logical block. The number of valid logical addresses among the maximum of 8 logical addresses stored in the logical address storage area 66 is defined as a duplication degree, and the total number of logical addresses stored in the logical address storage area 66 is defined as a use degree. The number of logical addresses that can be stored in the logical address storage area 66 is not limited to eight, and may be any arbitrary number. However, if a significantly large capacity is allocated to the logical address storage area 66, the data capacity for storing data in a single block 59 will decrease, and it is necessary to give consideration to the overhead of the management information storage area 63 upon deciding the number of logical addresses to be stored.

The correspondence of the logical address and the physical address, and the use degree and the duplication degree are now explained in detail with reference to FIG. 7 and FIG. 8.

Figure 7:
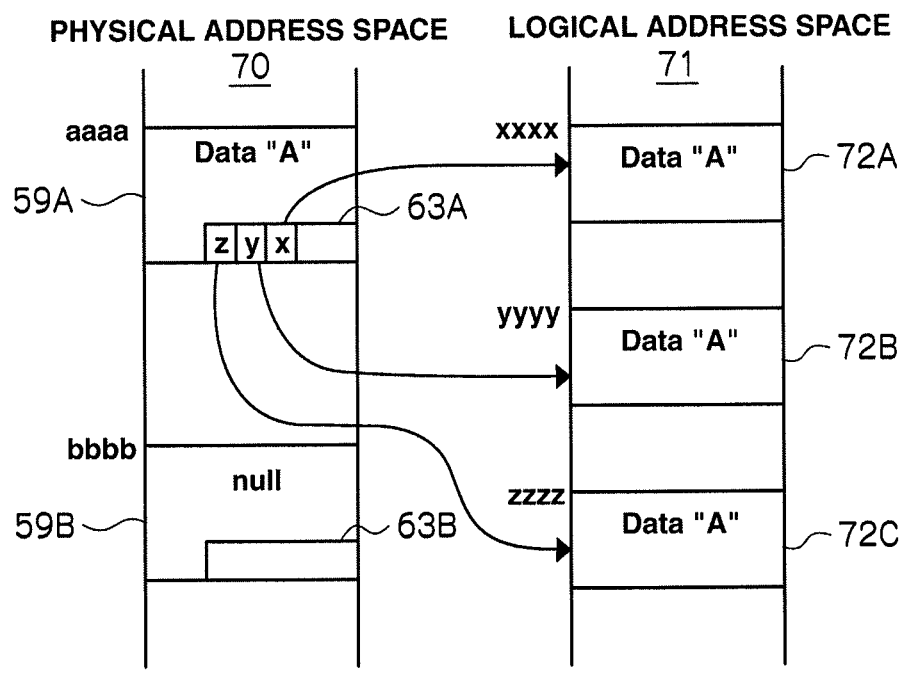
FIG. 7 is a conceptual diagram explaining the correspondence of a physical address and a logical address.

FIG. 7 shows the correspondence of the physical blocks 59A, 59B of the physical address space 70 and the logical blocks 72A to 72C of the logical address space 71. The first physical block 59A is a block starting from a physical address "aaaa," and data "A" is written therein. Let it be assumed that the first to third logical blocks 72A to 72B are associated with the first physical block 59A, and the logical addresses ("xxxx," "yyyy," "zzzz") of the first to third logical blocks 72A to 72C are stored in the logical address storage area 63A of the first physical block 59A.

Here, since all three of the logical addresses stored in the logical address storage area 63A of the first physical block 59A are valid, both the use degree and duplication degree of the first physical block 59A are set to "3."

Incidentally, the second physical block 59B starting from a physical address "bbbb" in the physical address space 70 is an unused block, and let it be assumed that no logical address is stored in the logical address storage area 63B.

Figures 8, 9:
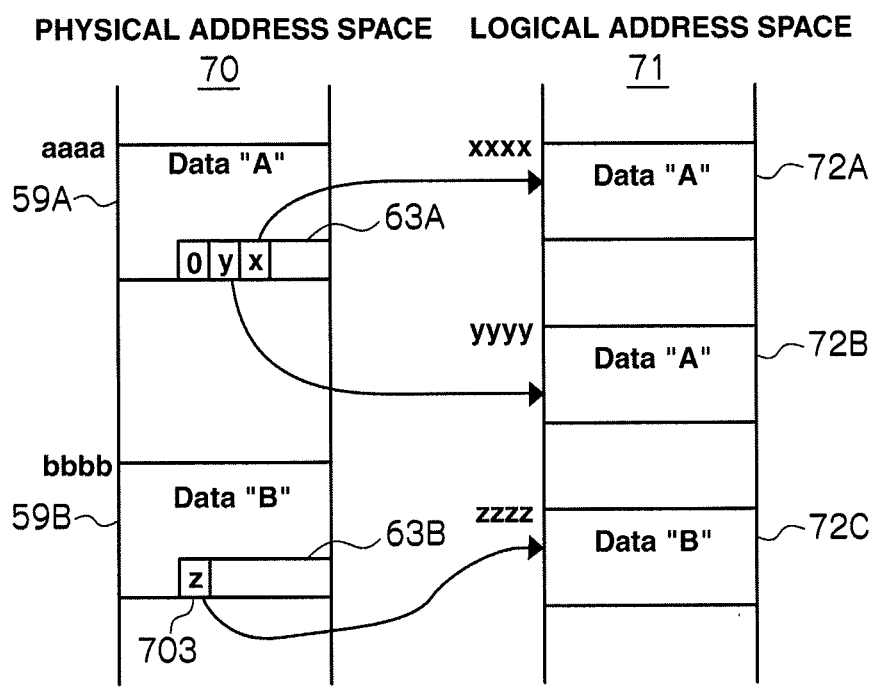
FIG. 8 is a conceptual diagram explaining the correspondence of a physical address and a logical address.
FIG. 9 is a conceptual diagram explaining an address translation table.

Meanwhile, when rewriting the data stored in the third logical block 72C of the logical address space 71 to "B" from this state, as shown in FIG. 8, data "B" is written into the second physical block 59B which was unused in the physical address space 70, and the logical address "zzzz" is written into the logical address storage area 63B of the second physical block 59B (703).

The logical address of the third logical block 72C in the logical address storage area 66 (FIG. 6) of the first physical block 59A storing "A" as the original data of the third logical block 72C is overwritten as "0," and thereby invalidated. As a result of rewriting the data of the third logical block 72C, the use degree of the first physical block 59A is set to "3," and the duplication degree is set to "2."

Like this, the duplication degree will increase or decrease depending on the rewriting of data, but the use degree will only increase and will not decrease. When the use degree reaches the maximum value (for instance, 8 in FIG. 6) of the number of logical addresses that can be stored in the logical address storage area 66, it is necessary to execute reclamation to the physical block 59 and return the logical address storage area 66 to an unused state.

FIG. 9 to FIG. 11 show the various management tables stored in the RAM 53 of the flash memory modules 3A to 3P as explained with reference to FIG. 4, and which are to be referred to by the processor 50. FIG. 9 shows the address translation table 80, FIG. 10 shows the hash value management table 82, and FIG. 11 shows the physical block management table 84, respectively.

The address translation table 80 is a table for translating the logical address recognized by the host system into a physical address associated with such logical address, and, as shown in FIG. 9, is configured from a "logical block address" column 81A, a "physical block address" column 81B, and a "written flag" column 81C.

The "logical block address" column 81A stores the logical addresses of the logical blocks associated with the storage area provided by the flash memory modules 3A to 3P among the logical addresses recognized by the host system, and the "physical block address" column 81B stores the physical addresses of the physical blocks associated with the foregoing logical addresses.

The "written flag" column 81C stores a written flag representing whether data has already been written into that physical block. The written flag is a flag showing that the corresponding logical address space is unused or written, and, for example, "1" is stored in the case of written and "0" is stored in the case of unused in the "written flag" column 81C.

The hash value management table 82 is a table for managing the hash value and the like of data written into the physical block of the flash memory modules 3A to 3P, and, as shown in FIG. 10, is configured from a "hash value" column 83A, a "physical block address" column 83B, a "control flag" column 83C, and a "logical address" column 83D.

The "hash value" column 83A stores the hash value of the corresponding data, and the "physical block address" column 83B stores the physical address of the physical block storing such data in the flash memory modules 3A to 3P. The "control flag" column 83C stores a control flag for determining whether processing has been performed for its entry as described later, and the "logical block address" column 83D stores the logical address of the logical block associated with the physical block storing such data.

Incidentally, there are cases where the same hash value corresponds to the physical address of a plurality of physical blocks in the hash value management table 82. There are also cases where the logical address of a plurality of logical blocks is stored for each hash value.

The physical block management table 84 is a table for managing the use degree and duplication degree for each physical block in the flash memory modules 3A to 3P, and is configured from a "physical block address" column 85A, a "use degree" column 85B, a "duplication degree" column 85C, and an "unused logical address storage area" column 85D.

The "physical block address" column 85A stores the physical address of the respective physical blocks in the flash memory modules 3A to 3P, and the "use degree" column 85B and the "duplication degree" column 85C respectively store the current use degree and duplication degree of the physical block. The "unused logical address storage area" column 85D stores the remaining number of logical addresses that can be stored in the logical address storage area 66 (FIG. 6) of the physical block. This remaining number will be the difference between "8" and the use degree when the maximum number of logical addresses that can be stored in the logical address storage area 66 is eight as shown in FIG. 6.

Figure 12:
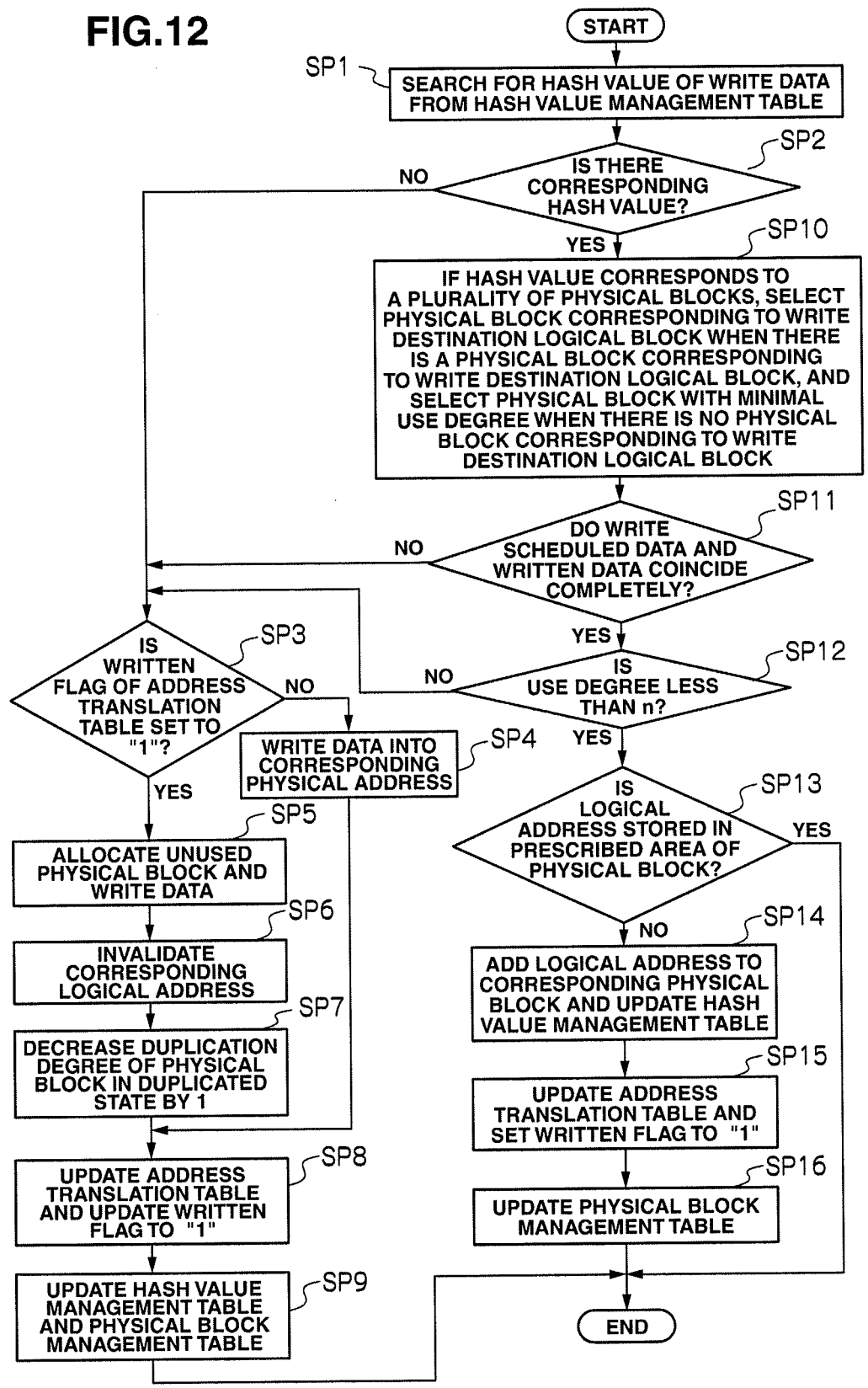
FIG. 12 is a flowchart explaining data write processing according to the first embodiment.

FIG. 12 shows the processing contents of the processor 50 (FIG. 4) of the flash memory modules 3A to 3P concerning the data write processing to be performed in the storage device 1 of the present embodiment. One feature of this embodiment is that the writing of data into the flash memory chip 58 and the deduplication processing are executed simultaneously.

In other words, when the processor 50 receives a write command and data to be written (hereinafter referred to as the "write data") from the storage controller 2, it starts the data write processing shown in FIG. 12, and searches for the hash value of the write data in the hash value management table 82 (FIG. 10) (SP1).

In the foregoing case, the hash value of the write data may be created with either the storage controller 2 (FIG. 1) or the flash memory controller 41 (FIG. 4) as described above. For instance, when the hash value is to be created with the storage controller 2, the processor 50 receives the hash value together with the write data from the storage controller 2, and searches for the hash value in the hash value management table 82. When the hash value is to be created in the flash memory modules 3A to 3P, the processor 50 calculates the hash value from the write data, and searches for the hash value in the hash value management table 82.

Subsequently, the processor 50 determines whether a hash value that corresponds to the hash value of the write data is registered in the hash value management table 82 based on the search results at step SP1 (SP2).

To obtain a negative result in this determination means that data that is considered to be the same as the write data has not yet been written into the flash memory module. Accordingly, there is no need to perform deduplication processing in this case. Here, the processor 50 determines whether the written flag of the entry corresponding to the logical block designated as the write destination of the write data in the address translation table 80 is set to "1" (SP3).

If the processor 50 obtains a negative result in this determination, it refers to the address translation table 80 and writes the write data into the physical block associated with the logical block designated as the write destination. The processor 50 additionally writes necessary information such as the logical address of such logical block and the hash value of such write data into the management information storage area 63 (FIG. 5) of the physical block (SP4), and thereafter proceeds to step SP8.

Meanwhile, if the processor 50 obtains a positive result in this determination, it refers to the physical block management table 84, allocates an unused physical block to the logical block, and writes the write data into such physical block (SP5).

Subsequently, the processor 50 invalidates the logical address of the logical block stored in the logical address storage area 66 (FIG. 6) of the management information storage area 63 (FIG. 5) of the physical block associated with the logical block designated as the write destination of the write data by overwriting it as "0" (SP6), and decreases the duplication degree of the entry corresponding to the physical block of the physical block management table 84 by "1" (SP7).

Subsequently, the processor 50 registers the entry that associated the logical block designated as the write destination of the write data and the physical block to which the write data was written at step SP5 in the address translation table 80, and additionally sets the written flag in that entry to "1" (SP8).

Subsequently, the processor 50 registers a new entry including information such as the hash value of the write data written into the unused physical block at step SP5, the physical address of the physical block, and the logical address of the logical block associated with the physical block in the hash value management table 82. The processor 50 sets "7" as the number of unused logical address storage areas 66 of the entry corresponding to the physical block in the physical block management table 84, additionally sets the use degree and duplication of such entry to "1," respectively (SP9), and thereafter ends this data write processing.

Meanwhile, if the processor 50 obtains a positive result in the determination at step SP2, it starts the deduplication processing, and foremost selects the physical block storing written data having the same hash value detected at step SP2 as the physical block to be associated with the logical block of the write destination of the write data. In the foregoing case, if there is a physical block corresponding to the write destination logical block of the write data in a case where the hash value corresponds to a plurality of physical blocks in the hash value management table 82, the processor 50 selects the physical block corresponding to the write destination logical block. If there is no physical block corresponding to the write destination logical block, the processor 50 refers to the physical block management table 84 and selects the physical block with the smallest use degree among the plurality of physical blocks (SP10).

Subsequently, the processor 50 determines whether the write data scheduled to be written and the write data written into the physical block selected at step SP10 coincide completely by comparing the two 1 bit at a time (SP11). Incidentally, step SP11 may be omitted if the coincidence or noncoincidence of data can be determined only with the coincidence or noncoincidence of the hash value.

If the processor 50 obtains a negative result in this determination, it proceeds to step SP3. Meanwhile, if the processor 50 obtains a positive result in this determination, it refers to the physical block management table 84 and determines whether the use degree of the physical block to which the write data was written is less than the maximum number n ("8" in this example) of the logical addresses that can be stored in the logical address storage area 66 of the physical block (SP12).

If the processor 50 obtains a negative result in this determination, it proceeds to step SP3. Meanwhile, if the processor 50 obtains a positive result in this determination, it determines whether the logical address of the logical block designated as the write destination of the write data is stored in the logical address storage area 66 (FIG. 6) of the management information storage area 63 (FIG. 5) of the physical block (SP13).

To obtain a positive result in this determination means that the same write data as the relevant write data has already been written into the physical block. The processor 50 thereby ends this data write processing without writing the write data into the physical block.

If the processor 50 obtains a negative result in the determination at step SP13, in order to perform deduplication, the processor 50 adds the logical address of the logical block designated as the write destination of the write data to the logical address storage area 66 in the management information storage area 63 of the physical block selected at step SP10, and additionally updates the hash value management table 82 accordingly (SP14).

The processor 50 registers the entry of the logical address of the logical block designated as the write destination of the write data and the physical address of the physical block selected at step SP10 in the address translation table 80, and additionally sets the value of the written flag in that entry to "1" (SP15).

Further, the processor 50 decreases the number of unused logical address storage areas 66 in the entry of the physical block management table 84 corresponding to the physical block selected at step SP10 by 1, additionally increases the use degree and duplication degree of such entry by 1, respectively (SP16), and thereafter ends this data write processing.

Figure 13:
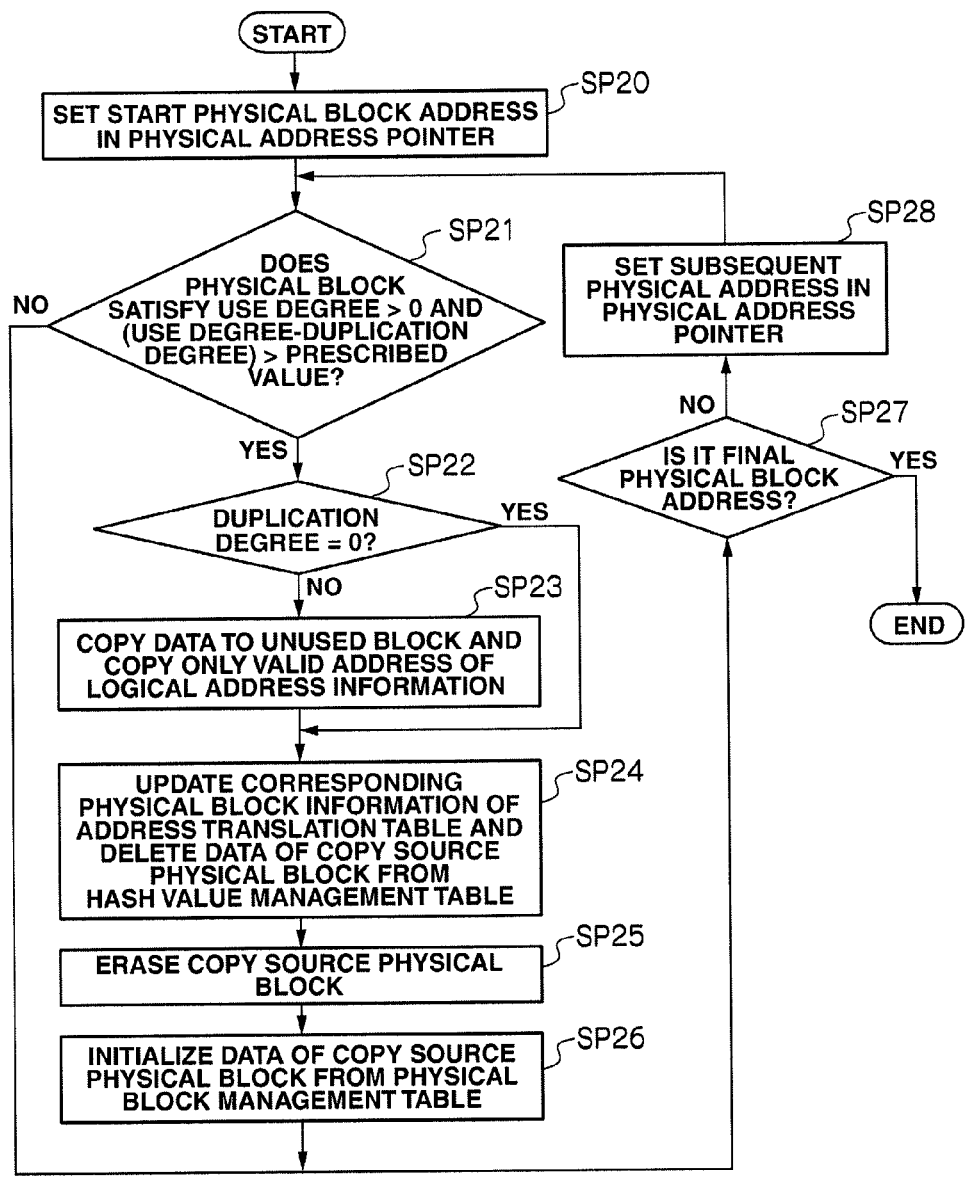
FIG. 13 is a flowchart explaining reclamation processing according to the first embodiment.

Meanwhile, FIG. 13 shows the processing contents of the processor 50 of the flash memory modules 3A to 3P concerning the reclamation processing to be performed separately from the data write processing. The reclamation processing is characterized in that whether to execute reclamation to the physical block is determined based on the difference between the use degree and duplication degree of such physical block.

When the storage controller 2 detects the flash memory modules 3A to 3P in an idle state, it issues a reclamation execution command to the flash memory modules 3A to 3P, and the processor 50 of the flash memory modules 3A to 3P that received the foregoing execution command executes the reclamation processing shown in FIG. 13 according to the corresponding control programs stored in the RAM 53.

In other words, when the processor 50 receives the reclamation execution command from the storage controller 2, it starts the reclamation processing, foremost refers to the physical block management table 84, and sets the physical address pointer to the smallest physical address as a start physical address (SP20).

Subsequently, the processor 50 refers to the physical block management table 84, and then determines whether the use degree of the physical block indicated by the physical block pointer at such time is greater than "0" (physical block is not unused), and whether the differential value of the use degree and duplication degree of the physical block is greater than a predetermined threshold value (whether the number of invalidated logical addresses (logical addresses overwritten as "0") among the logical addresses stored in the logical address storage area 66 of the physical block is greater than the threshold value) (SP21).

If the processor 50 obtains a negative result in this determination, it proceeds to step SP27. Meanwhile, if the processor 50 obtains a positive result in this determination, it determines whether the duplication degree of the physical block is "0" (SP22).

To obtain a positive result in this determination means that there is no valid logical address (logical address that is not overwritten as "0") in the logical address storage area 66 of the physical block; that is, the write data that was stored in the physical block has already been updated and stored in another physical block. The processor 50 thereby proceeds to step SP24.

Meanwhile, to obtain a negative result in this determination means that there is a valid logical address in the logical address storage area 66 of the physical block (data stored in the physical block is valid data that has not yet been updated). The processor 50 thereby copies the write data stored in the physical block to an unused physical block. The processor 50 selects an unused physical block with a low erase count as the copy destination physical block. Here, the processor 50 copies only the valid logical addresses among the logical addresses stored in the logical address storage area 66 of the copy source physical block to the logical address storage area 66 of the copy destination physical block (SP23).

Subsequently, the processor 50 rewrites the physical address of the corresponding entry of the address translation table 80 as the physical address of the copy destination physical block, additionally rewrites the physical address in the corresponding entry of the hash value management table 82 as the physical address of the copy destination physical block (SP24), and thereafter erases the write data written into the physical block from the copy source physical block (SP25).

Subsequently, the processor 50 initializes the entry of the copy source physical block in the physical block management table 84 (SP26). Specifically, the processor 50 sets both the use degree and duplication degree to "0" regarding the entry of the copy source physical block in the physical block management table 84, and additionally returns the number of unused logical address storage areas 66 to "8."

Subsequently, the processor 50 refers to the physical block management table 84, and determines whether the physical block pointer is indicating the final physical address of the physical block (SP27).

If the processor 50 obtains a negative result in this determination, it refers to the physical block management table 84, and sets the physical address pointer to the subsequent physical address of the physical address indicated by the physical address pointer at such time. However, the physical address of the physical block selected as the copy destination at step SP23 shall be excluded (SP28).

The processor 50 thereafter repeats the processing of step SP21 to step SP28 until it obtains a positive result at step SP27. As a result, the reclamation processing to the physical blocks satisfying the conditions at step SP21 among the physical blocks in the flash memory modules 3A to 3P will be performed sequentially.

When the processor 50 eventually obtains a positive result at step SP27 as a result of the reclamation to all corresponding physical blocks being completed, it ends this reclamation processing.

The effect that the deduplication processing of the present embodiment has on the flash memory endurance of the flash memory is now explained. Foremost, the count E1 as the number of required erase cycles of the data stored in the physical blocks of the flash memory when deduplication processing is not performed can be represented with the following formula:

[Formula 5]

$$E1 = \text{Write Data Size}/\text{Block Size} \quad (5)$$

Meanwhile, when deduplication processing is performed with the data duplication ratio as m, the ratio E2 as the required erase cycles of the data stored in the physical blocks of the flash memory can be represented with the following formula:

[Formula 6]

$$E2 = \text{Write Data Size} \times (1-m)/\text{Block Size} + 1 \quad (6)$$

Assuming that the size of the write data is sufficiently large, if the "+1" in the second term of E2 is ignored, the erase count of the data stored in the physical block via deduplication will be (1−m) times. In other words, the flash memory endurance of the flash memory will increase 1/(1−m) times as a result of performing deduplication. For example, if data that is duplicated 50% on average is written, the medium life duration will increase roughly twofold. In addition, since the duplicated data is not actually written into the physical block and is merely added to the logical address, the rewriting time can be shortened, and the write performance can be improved.

To be precise, however, consideration must be given to the influence that the overhead of the management information storage area 66 (FIG. 5) provided for each physical block will have on the flash memory endurance life extension effect. If a management area of 512 B is reserved for each block size of 128 kB, the medium life extension effect resulting from deduplication will be 512 B/128 kB=deterioration of roughly 0.4%.

The storage device according to the present embodiment described above is able to seek a longer operating life of the flash memory by employing the deduplication technology, as well as manage the use degree and duplication degree for each physical block and execute reclamation to the physical block when the difference between the use degree and duplication degree exceeds a threshold value. Thus, it is possible to conveniently perform reclamation, prevent the degradation of the deduplication efficiency, and improve the space efficiency of the flash memory.

(2) Second Embodiment

The second embodiment is characterized in that deduplication processing is not executed during the data write processing to the flash memory 42 as in the first embodiment, but is rather performed at a different timing from the data write processing in the respective flash memory modules 3A to 3P, and that deduplication processing is performed to each of a plurality of duplicated data.

Figure 14:
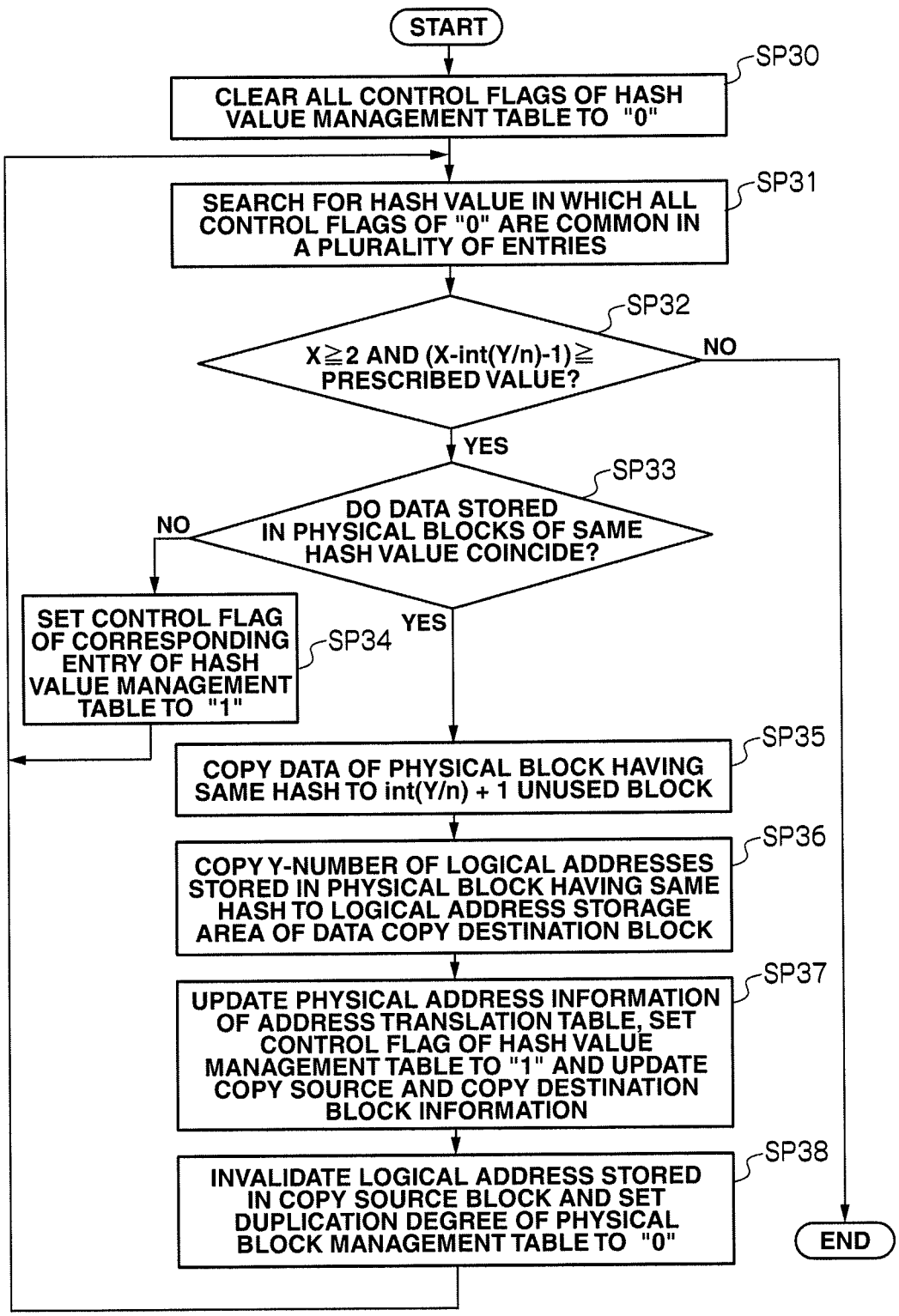
FIG. 14 is a flowchart explaining deduplication processing according to the second embodiment.

FIG. 14 shows the specific processing contents of the processor 50 of the flash memory modules 3A to 3P concerning the deduplication processing in the second embodiment. The processor 50 executes the deduplication processing shown in FIG. 14 according the corresponding programs stored in the RAM 53 (FIG. 4).

In other words, when the processor 50 receives a deduplication execution command from the storage adapters 6A, 6B (FIG. 1), it starts this deduplication processing, and foremost sets all control flags of the respective entries in the hash value management table 82 to "0" (SP30).

Subsequently, the processor 50 searches for the hash value that is common among a plurality of entries in which the control flag is set to "0" in the hash value management table 82 (SP31). If the processor 50 detects a plurality of hash values during the search, it selects the hash value when the left-hand side of Formula (8) to be mentioned later becomes the maximum, and executes the following processing according to this hash value.

Subsequently, the processor 50 refers to the physical block management table 84, and, with the number of physical blocks corresponding to the respective entries of the hash value detected in the search at step SP31 as X, and the number of valid logical addresses stored in the logical address storage area of the physical blocks as Y, the processor 50 determines whether X and Y satisfy the following formulas (SP32):

[Formula 7]

$$X \geq 2 \quad (7)$$

[Formula 8]

$$X - \text{int}(Y/n) - 1 \geq \text{Threshold Value} \quad (8)$$

Here, Y can be sought as the total duplication degree of the physical blocks.

Here, n is the maximum value ("8" in this example) of the number of logical addresses that can be stored in the logical address storage area 66 (FIG. 6) of the physical block, and int(Y/n) represents an integer that is equal or smaller than Y/n yet closest to Y/n. Thus, since int(Y/n)+1 is the number of used physical blocks after the deduplication processing is performed, the left-hand member of Formula (8) represents the deduplication processing effect.

To obtain a negative result in this determination means that there is no hash value that is common among the plurality of entries in which the control flag is set to "0," or, although such hash value exists, a significant effect cannot be expected even if the deduplication processing is performed. The processor 50 thereby ends this deduplication processing.

Meanwhile, to obtain a positive result in the determination at step SP32 means that there is a hash value that is common among the plurality of entries in which the control flag is set to "0," and a significant effect can be expected if the deduplication processing is performed.

The processor 50 thereby determines whether all write data stored in the respective physical blocks of a plurality of entries are identical by comparing the write data stored in the respective blocks of the plurality of entries detected at step SP31 1 bit at a time (SP33). Step SP33 can be omitted if the data coincidence can be guaranteed only with the coincidence of the hash value.

If the processor 50 obtains a negative result in this determination, it ends the deduplication processing to the write data stored in the physical blocks of the respective entries, changes every control flag of the respective entries to "1" (SP34), and then returns to step SP31.

Meanwhile, if the processor 50 obtains a positive result in this determination, it copies the same write data stored in the respective physical blocks of the plurality of entries detected at step SP31 to int(Y/n)+1 unused physical blocks (SP35). Here, the processor 50 selects an unused physical block with a low erase count as the copy destination physical block.

Subsequently, the processor 50 distributes and stores the logical address of the respective logical blocks associated with the respective physical blocks of the copy source in the logical address storage area 66 (FIG. 6) of the respective physical blocks of the write data copy destination (SP36).

The processor 50 thereafter updates the physical address of the respective corresponding entries of the address translation table 80; that is, the physical address of the entries corresponding to the respective logical blocks associated with the copy source physical block to the physical address of the physical blocks in which the logical address of the logical block was stored in the logical address storage area 66 at step SP36. The processor 50 also updates the control flags of the respective entries corresponding to the hash value of the write data copied at step SP35 in the hash value management table 82 to "1," and additionally updates the physical address of the entries, or the physical address and the logical address of such entries according to the processing at step SP35 and step SP36 (SP37).

Subsequently, the processor 50 invalidates all logical addresses by overwriting all such logical addresses stored in the logical address storage area 66 of the physical blocks regarding the respective physical blocks of the write data copy source at step SP35 as "0." The processor 50 also rewrites the duplication degree of the respective physical blocks of the copy source in the physical block management table 84 as "0" (SP38).

Subsequently, the processor 50 returns to step SP31, and thereafter repeats the same processing (SP31 to SP38 and back to SP31). When the processor 50 eventually obtains a negative result at step SP32, it ends this deduplication processing.

According to the present embodiment described above, since deduplication processing is performed at a timing that is different from the timing of writing data; for instance, when the flash memory module is in an idle state, in addition to the effect obtained in the first embodiment, the second embodiment is able to yield a special effect of being able to effectively prevent the deterioration in the processing speed of data write processing caused by executing deduplication processing when data write processing is overlappingly performed.

(3) Third Embodiment

The third embodiment is characterized in that deduplication processing is not performed collectively to a plurality of physical blocks storing identical data as in the second embodiment, but rather deduplication processing is performed to each physical block pair storing identical data.

Figure 15:
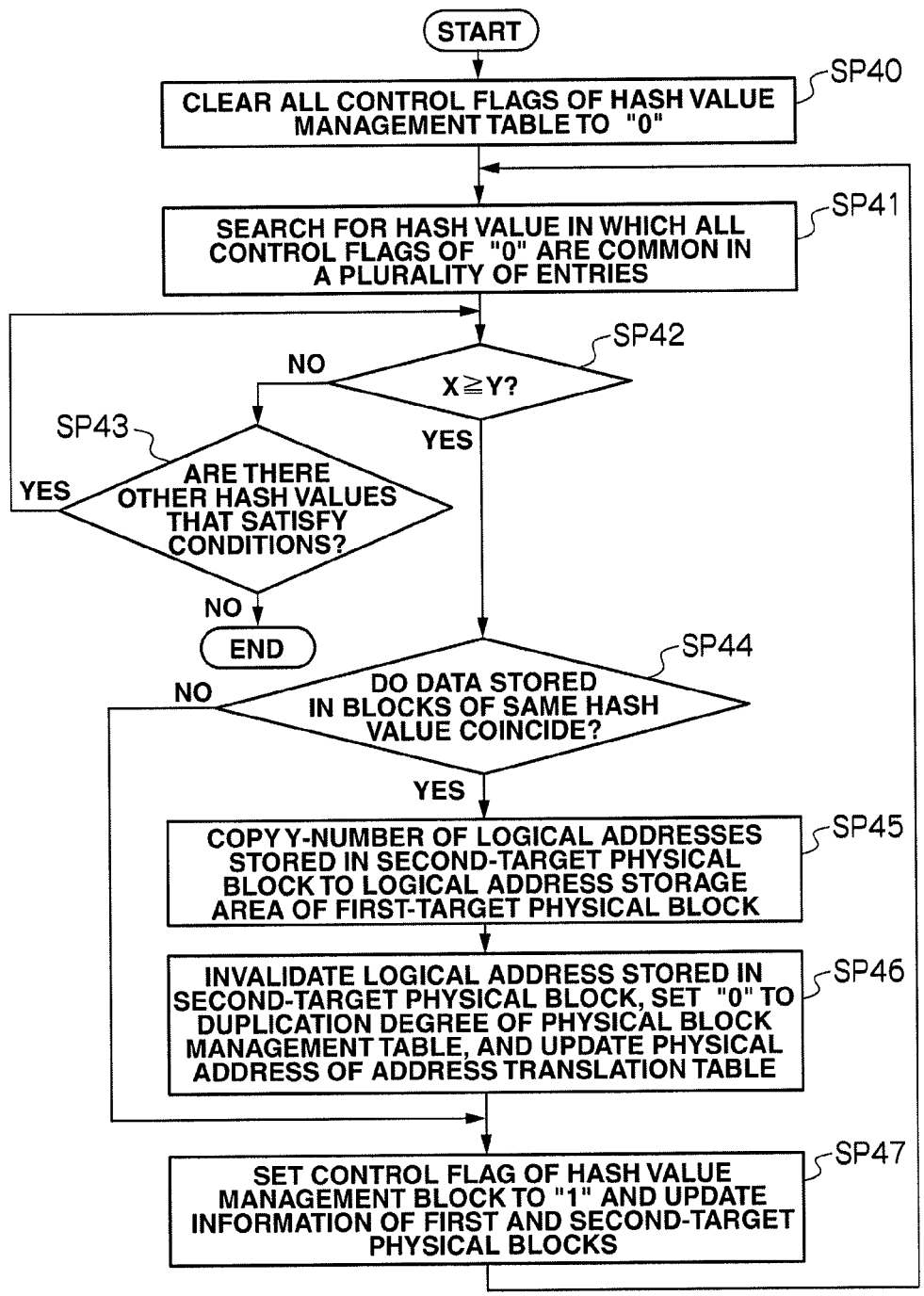
FIG. 15 is a flowchart explaining deduplication processing according to the third embodiment.

FIG. 15 shows the specific processing contents of the processor 50 of the flash memory modules 3A to 3P concerning the deduplication processing in the third embodiment. The processor 50 executes the deduplication processing shown in FIG. 15 according to the corresponding control programs stored in the RAM 53 (FIG. 4).

In other words, when the processor 50 receives a deduplication execution command from the storage adapters 6A, 6B (FIG. 1), it starts the deduplication processing, and foremost sets all control flags of the respective entries of the hash value management table 82 to "0" (SP40).

Subsequently, the processor 50 searches for the hash value that is common among a plurality of entries in which the control flag is set to "0" in the hash value management table 82 (SP41). If the processor 50 detects a plurality of hash values that satisfy the foregoing condition (i.e., common among a plurality of entries in which the control flag is set to "0") during the search, it selects only the initially detected hash value, and executes the following processing according to this hash value.

In the ensuing explanation, the physical block with the largest number of unused logical address storage areas 66 registered in the physical block management table 84 among the physical blocks corresponding to the respective entries of the hash value detected during the search at step SP41 is referred to as a first-target physical block, and the block with the smallest number of unused logical address storage areas 66 among the among the physical blocks corresponding to the respective entries of the hash value detected during the search at step SP41 and having the smallest duplication degree is referred to as a second-target physical block.

Subsequently, the processor 50 refers to the physical block management table 84. Subject to the existence of a plurality of entries having the same hash value and a control flag of "0," and with the number of unused logical address storage areas 66 in the first-target physical block as X and the duplication degree of the second-target physical block as Y, the processor 50 determines whether it is possible to add the logical address stored in the logical address storage area 66 of the second-target physical block to the unused area of the logical address storage area 66 in the first-target physical block (X≧Y) (SP42).

If the processor 50 obtains a negative result in this determination, it once again searches for the hash value that satisfies the foregoing conditions at step SP41 in the hash value management table 82 so as to determine whether there is another hash value that satisfies such conditions (SP43). If the processor 50 obtains a negative result in this determination, it ends this deduplication processing.

Meanwhile, if the processor 50 obtains a positive result in this determination, it returns to step SP42, and thereafter repeats the same processing until it obtains a positive result at step SP42 or a negative result at step SP43 (SP42-SP43-SP42).

When the processor 50 eventually obtains a positive result at step SP42, it determines whether all data stored in the respective physical blocks of a plurality of entries are identical by comparing the data stored in the first-target physical block and the data stored in the second-target physical block 1 bit at a time (SP44). Step SP44 can be omitted if the data coincidence can be guaranteed only with the coincidence of the hash value.

Figure 16:
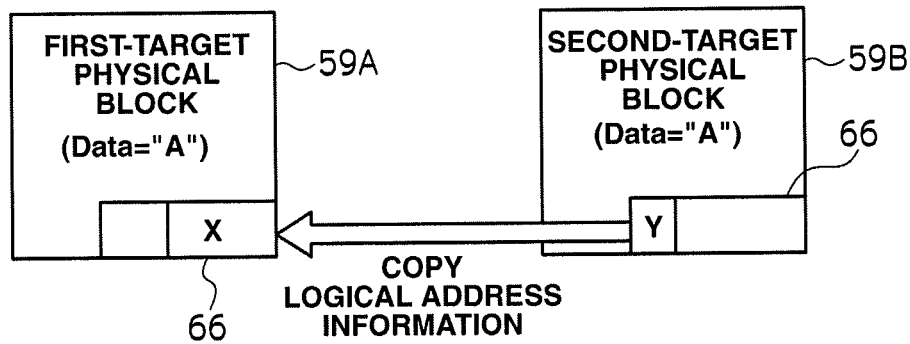
FIG. 16 is a conceptual diagram explaining deduplication processing according to the third embodiment.

If the processor 50 obtains a positive result in this determination, as shown in FIG. 16, it copies all logical addresses stored in the logical address storage area 66 of the second-target physical block to the logical address storage area 66 of the first-target physical block (SP45). Incidentally, the data written into the first and second-target physical blocks 59A, 59B in FIG. 16 are both "A." FIG. 16 also shows a state where the logical address of "Y" stored in the logical address storage area 66 of the second-target physical block 59B is being copied to an unused area in the logical address storage area 66 of the first-target physical block. If the processor 50 obtains a negative result at step SP44, it proceeds to the processing at step SP47.

The processor 50 thereafter invalidates all logical addresses stored in the logical address storage area 66 of the second-target physical block by overwriting all such logical addresses as "0." The processor 50 additionally changes the duplication degree of the entries corresponding to the second-target physical block of the physical block management table 84 to "0." Moreover, the processor 50 erases all logical addresses of entries corresponding to the second-target physical block of the address translation table 80, and adds all such erased logical addresses to the address translation table 80 as logical addresses of entries corresponding to the first-target physical block (SP46).

The processor 50 additionally changes the value of the control flags of entries corresponding to the second-target physical block in the hash value management table 82 to "1," updates the physical address and logical address in such entries, and updates the use degree, duplication degree and the number of unused logical address storage areas 66 of entries corresponding to the first-target physical block in the physical block management table 84 (SP47).

The processor 50 thereafter returns to step SP41, and repeats the same processing until it obtains a negative result at step SP43 (SP41 to SP47 and back to SP41). When the processor 50 eventually obtains a negative result at step SP43, it ends this deduplication processing.

According to the present embodiment described above, since deduplication processing is performed to each pair of physical blocks storing identical data, it is possible to obtain the equivalent effect as the effect of the first embodiment.

(4) Fourth Embodiment

The foregoing first to third embodiments explained cases of performing deduplication processing in physical block units. Meanwhile, the fourth embodiment is characterized in that deduplication processing is performed at a data size that is smaller than the block size of a physical block.

Figure 17:
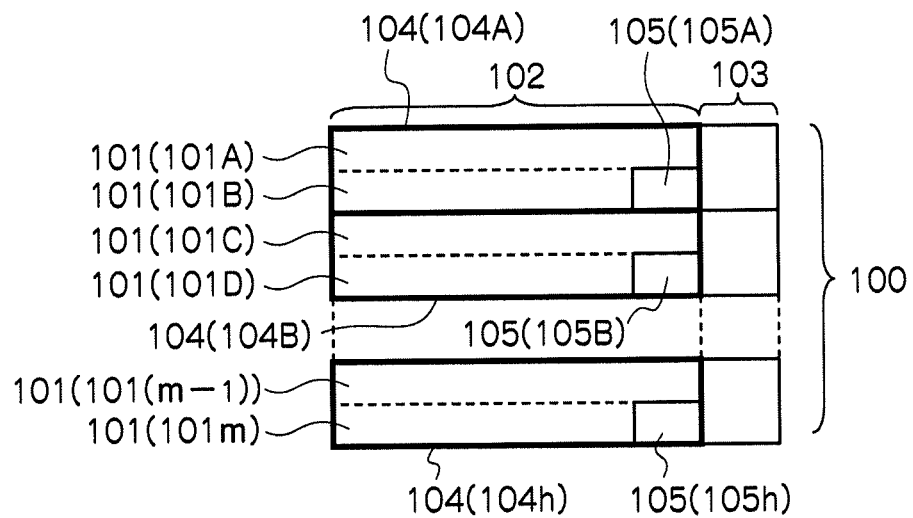
FIG. 17 is a conceptual diagram explaining the data structure of a physical block according to the third embodiment.

FIG. 17 shows the data structure of the physical block 100 in the flash memory modules 3A to 3P according to the present embodiment. In FIG. 17, the physical block 100 includes pages 101 (101A to 101m (m is an integer)) from number 1 to number m. These pages 101 are all configured from a data section 102 and a redundant section 103 which are the same as the data section 61 and the redundant section 62 described above with reference to FIG. 6.

This embodiment explains a case of executing deduplication processing in 2 page units. In the following explanation, the page unit (2 pages in this example) for executing the deduplication processing is referred to as a sub block 104. For example, the physical block 100 includes a sub block 104A configured from first and second pages 101A, 101B, a sub block 104B configured from third and fourth pages 101C, 101D, and a sub block 104h (h=m/2) configured from m−1 and m pages 101 (m−1), 101m. The respective sub blocks 104A to 104h are provided with a management information storage area 105 (105A to 105h) having the same functions as the management information storage area 63 described above with reference to FIG. 4.

In order to simplify the ensuing explanation, the data reading/writing units and the deduplication processing units will be sub block units. In other words, in this embodiment, let it be assumed that all information is managed in sub block units in the address translation table 80 of FIG. 9, the hash value management table 82 of FIG. 10 and the physical block management table 84 of FIG. 11. Deduplication processing in sub block units can be executed by replacing "block" with "sub block" in the explanation of the deduplication processing in the second or third embodiment explained with reference to FIG. 14 or FIG. 15.

Nevertheless, reclamation processing needs to be corrected since a sub block is not a unit of erasure. Thus, the reclamation processing in a case of making the data reading/writing unit and deduplication processing unit a sub block 104 is explained below.

Figure 18:
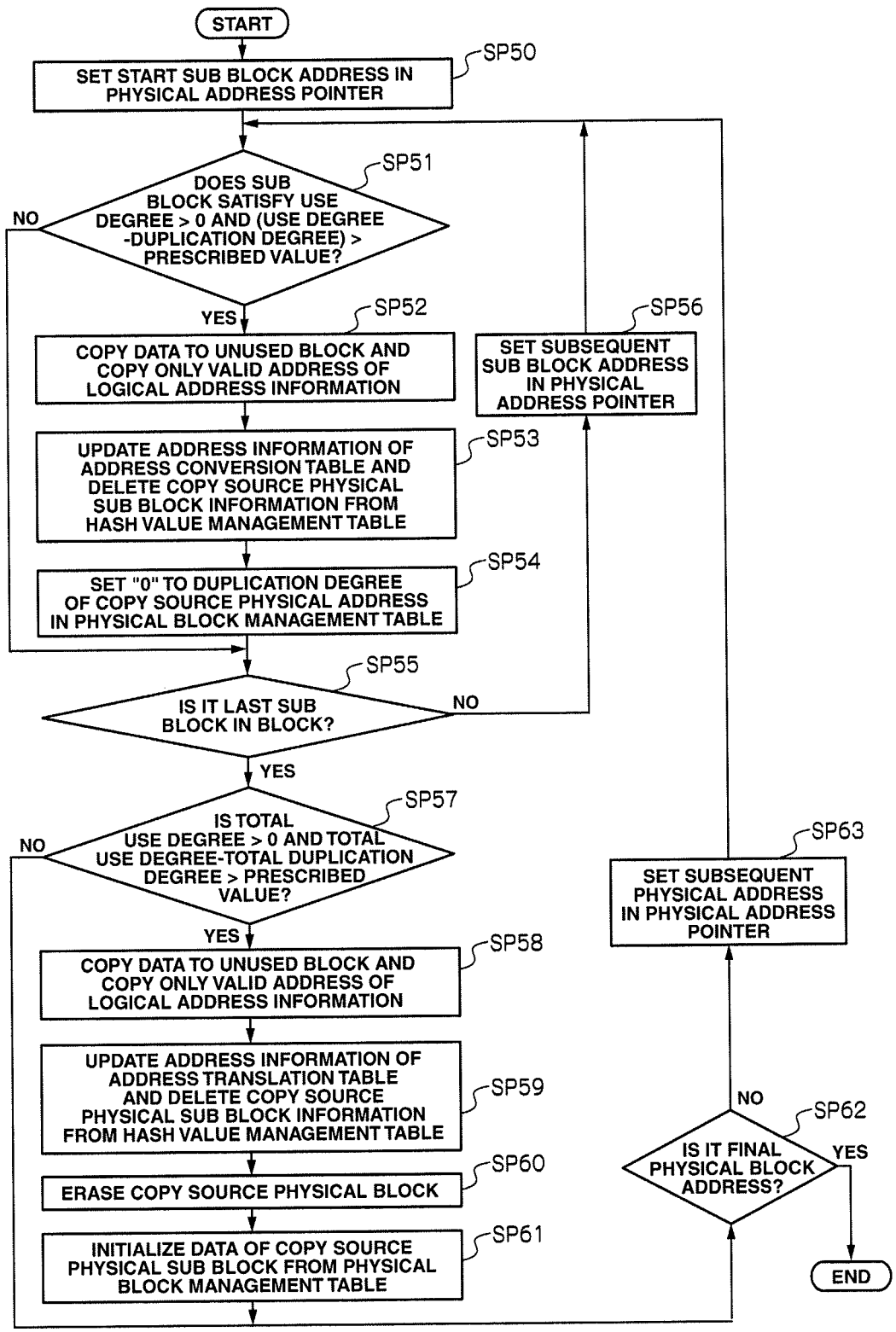
FIG. 18 is a flowchart explaining reclamation processing according to the fourth embodiment.

FIG. 18 shows the processing contents of the processor 50 of the flash memory modules 3A to 3P concerning reclamation processing in a case of making the data reading/writing unit and deduplication processing unit a sub block unit. This reclamation processing is characterized in that data copy is performed in the two stages of sub block units and block units, and the processor 50 executes the reclamation processing shown in FIG. 18 according to the corresponding programs stored in the RAM 53 (FIG. 4).

In other words, when the processor 50 receives a reclamation execution command from the storage controller 2, it starts the reclamation processing, foremost refers to the physical block management table (refer to FIG. 11), and sets the physical address pointer to the physical address of the physical block with the smallest physical address (SP50).

Subsequently, the processor 50 refers to the physical block management table (refer to FIG. 11), and then determines whether the use degree of the sub block 104 in the physical block indicated by the physical block pointer at such time is greater than "0" (sub block 104 is not unused), and whether the differential value of the use degree and duplication degree of the sub block 104 is greater than a predetermined threshold value (whether the number of invalidated logical addresses among the logical addresses stored in the logical address storage area in the management information storage area 105 of the sub block 104 is greater than the threshold value) (SP51).

If the processor 50 obtains a negative result in this determination, it proceeds to step SP55. Meanwhile, if the processor 50 obtains a positive result in this determination, it copies the data stored in the sub block 104 to the sub block 104 of an unused physical block 100. The processor 50 additionally copies only the valid logical addresses among the logical addresses stored in the logical address storage area of the copy source sub block 104 to the logical address storage area of the copy destination sub block 104 (SP52).

Subsequently, the processor 50 rewrites the address of the sub block 104 of entries corresponding to the address translation table (refer to FIG. 9) with the address of the copy destination sub block 104, deletes entries corresponding to the copy source sub block 104 from the corresponding entries of the hash value management table (refer to FIG. 10) (SP53), and thereafter updates the duplication degree of entries corresponding to the copy source sub block 104 in the physical block management table to "0" (SP54).

Subsequently, the processor 50 determines whether the processed sub block 104 is the final sub block 104 in the target physical block 100 based on the physical block management table (SP55).

If the processor 50 obtains a negative result in this determination, it sets the physical address pointer to the address of the subsequent sub block 104 in the physical block 100 (SP56), thereafter returns to step SP51, and repeats the same processing (SP51 to SP56 and back to SP51).

When the processor 50 eventually obtains a positive result at step SP55 as a result of completing the same processing to all sub blocks 104 in the target physical block 100, it determines whether the total use degree of the respective sub blocks 104 in the physical block 100 is greater than 0, and whether the value obtained by subtracting the total duplication degree from the total use degree of the respective sub blocks 104 is greater than a prescribed threshold value (SP57).

If the processor 50 obtains a negative result in this determination, it proceeds to step SP62. Meanwhile, if the processor 50 obtains a positive result in this determination, it copies the data stored in the physical block 100 to an unused physical block 100 according to the same processing at step SP23 to step SP26 of the reclamation processing explained above with reference to FIG. 13, and accordingly updates the address translation table, the hash value management table and the physical block management table (SP59 to SP61).

Subsequently, the processor 50 refers to the physical block management table and determines whether the physical block pointer is indicating the physical address of a physical block with the final physical address (SP62).

If the processor 50 obtains a negative result in this determination, it refers to the physical block management table and sets the physical address pointer to a physical address that is subsequent to the physical address that the physical address pointer was indicating at such time. However, the physical address of the physical block 100 selected as the copy destination at steps SP52, SP58 shall be excluded (SP63).

The processor 50 thereafter returns to step SP51, and repeats the processing of step SP51 to step SP63 until it obtains a positive result at step SP62. Consequently, reclamation processing will be sequentially performed to the physical block 100 in the flash memory modules 3A to 3P, the physical block that satisfies the conditions of step SP57 among the sub blocks 104 in the physical block 100, and the sub blocks 104 that satisfy the conditions of step SP51.

When the processor 50 eventually obtains a positive result at step SP62 as a result of completing the reclamation to all corresponding physical blocks 100 and sub blocks 104, it ends this reclamation processing.

According to the present embodiment described above, since deduplication processing is performed in a data size that is smaller than the block size of the physical block, the deduplication efficiency can be further improved in comparison to the first to third embodiments.

(5) Fifth Embodiment

Foremost, the striping (data partitioning) operation of RAID (Redundant Array of Inexpensive Disks) is explained.

Figures 19, 20:
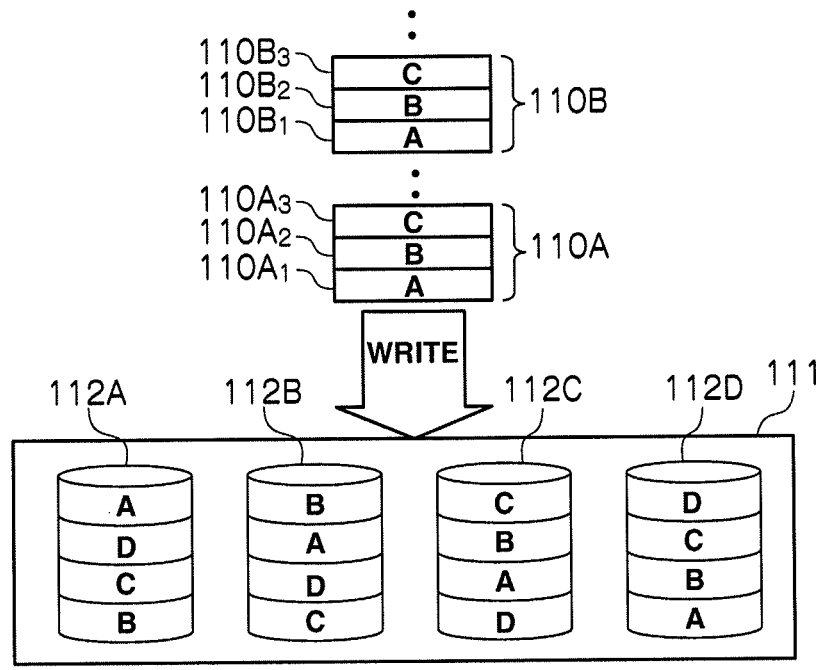
FIG. 19 is a conceptual diagram explaining a RAID striping operation.
FIG. 20 is a conceptual diagram explaining a deduplication processing management table according to the fifth embodiment.

With RAID, as shown in FIG. 19, data is partitioned in data units referred to as stripes 110A, 110B, ..., and these stripes 110A, 110B, ... are further partitioned into data units referred to as stripe units 110A1 to 110A3, 110B1 to 110B3, .... The respective stripe units 110A1 to 110A3, 110B1 to 110B3, ... configuring the same stripe 110A, 110B, ... are distributed to a plurality of storage mediums 112A to 112D configuring a RAID group 111 and read and written at the same timing. The following explanation is made on the assumption that the storage mediums 112A to 112D are flash memory modules.

Incidentally, a plurality of levels such as RAID 0, RAID 1, and RAID 1+0 are defined in RAID depending on the method of redundancy or size of striping. For example, with RAID 5, as shown in FIG. 19, the parity created from the stripe units 110A1 to 110A3, 110B1 to 110B3, ... configuring the same stripe 110A, 110B, is distributed and stored in the respective flash memory modules 112A to 112D configuring the RAID group 111. As a result, even if the stripe 110A and the stripe 110B possess completely identical data, there will be no duplicated data in the flash memory module. In other words, in a case where data is duplicated in each stripe unit 110A1 to 110A3, 110B1 to 110B3, ..., no effect can be expected even if deduplication processing is performed to each flash memory module 112A to 112D.

Meanwhile, when viewing the overall RAID group 111, duplicated data will exist across a plurality of flash memory modules 112A to 112D. In order to eliminate this duplicated state, a storage controller capable of accessing the overall RAID group 111 needs to perform deduplication processing.

Thus, in this embodiment, the storage controller 2 (FIG. 1) of the storage device 1 executes deduplication processing in a data processing unit that is equal or greater than the stripe unit size and to an extent across a plurality of flash memory modules 3A to 3P (FIG. 1). Moreover, in this embodiment, deduplication processing is executed in the flash memory modules 3A to 3P at a data processing unit that is equal or smaller than the stripe unit size. Like this, since the possibility of data duplication will increase as a result of executing deduplication processing at data processing units of different hierarchy, the deduplication effect can be improved.

Specifically, the storage controller 2 commands the flash memory modules 3A to 3P via the network 12A or the network 12B on the data processing unit of stripe size unit of deduplication processing to be executed for each flash memory module 3A to 3P as necessary. Thereby, deduplication in the storage controller 2 and the flash memory modules 3A to 3P can be coordinated.

As another example of hierarchical control of deduplication, the storage controller 2 may monitor the statistical information of the use degree or duplication degree of the respective physical blocks existing in the flash memory modules 3A to 3P via the network 12A or network 12B for each flash memory module 3A to 3P, and discontinue performing deduplication processing to the flash memory modules 3A to 3P that will not yield any deduplication effect.

The storage controller 2 may also check the statistical information concerning the duplication degree and number of unused physical blocks for each flash memory module 3A to 3P via the network 12A, 12B, calculate the product of such duplication degree and number of unused physical blocks, and predict the capacity for storing data in the future for each flash memory module 3A to 3P.

FIG. 20 shows the deduplication management table 120 that is stored and managed by the storage controller 2 for performing the deduplication processing according to the present embodiment as described above. As evident from FIG. 20, the deduplication management table 120 is configured from a "logical unit number" column 120A, a "logical block address" column 120B, an "upper level control" column 120C, and a "lower level control" column 120D. The "logical block address" column 120B is configured from a "start logical block address" column 120BA and a "final logical block address" column 120BB, and the "upper level control" column 120C is configured from an "upper level control flag" column 120CA and an "upper level control size" column 120CB. The "lower level control" column 120D is configured from a "lower level control flag" column 120DA and a "lower level control size" column 120DB.

The "logical unit number" column 120A stores the logical unit number of the respective logical units under the control of the storage controller 2, and the "start logical block address" column 120BA and the "final logical block address" column 120BB respectively store the logical address of the first logical block and the logical address of the final logical block to be subject to deduplication processing in the logical unit. The logical address of the first logical block and the logical address of the final logical block to be subject to deduplication are set by the user using the processing maintenance terminal 10 (FIG. 1).

The "upper level control flag" column 120CA stores a flag (hereinafter referred to as the "deduplication processing execution decision flag") representing whether the storage controller 2 will execute deduplication processing to that logical unit, and the "upper level control size" column 120CB stores the data processing unit (hereinafter referred to as the "deduplication processing execution unit") upon executing such deduplication processing. The flags and data processing units stored in the "upper level control flag" column 120CA and the "upper level control size" column 120CB are also set by the user using the maintenance terminal 10 (FIG. 1).

The "lower level control flag" column 120DA stores flags representing whether deduplication processing will be executed in the flash memory modules 3A to 3P having a physical unit to which the logical unit is associated, and the "lower level control size" column 120DB stores the data processing unit to be used upon executing the deduplication processing in the flash memory modules 3A to 3P. The flags and data processing units stored in the "lower level control flag" column 120DA and the "lower level control size" column 120DB are also set by the user using the maintenance terminal 10 (FIG. 1).

The storage controller 2 executes deduplication processing in at a data processing unit that is equal or greater than the stripe unit size and to an extent across the plurality of flash memory modules 3A to 3P by controlling the corresponding flash memory modules 3A to 3P as necessary based on the deduplication management table 120.

As a setting example of the execution decision of deduplication processing, there are cases where the setting is such that deduplication processing is not performed to data demanded of redundancy rather than capacity efficiency. Or, when throughput of reading and writing is emphasized rather than the capacity efficiency, or to data with concentrated access, data may be distributed to and stored in a plurality of physical mediums without executing deduplication processing.

With the present embodiment described above, since deduplication processing is executed at a data processing unit that is equal or greater than the stripe unit size and to an extent across the plurality of flash memory modules 3A to 3P, deduplication in the storage controller 2 and the flash memory modules 3A to 3P can be coordinated, and the deduplication processing effect can thereby be improved even further.

What is claimed is:

1. A storage device, comprising: one or more flash memory modules; and a storage controller that controls the flash memory modules; wherein, for each of the flash memory modules: the flash memory module includes a flash memory chip, wherein the flash memory chip includes a physical unit memory area for storing data; the flash memory module includes a controller that controls reading and writing of data from and into the flash memory chip; prescribed management information stored in the storage device indicates associations between the physical unit memory area and one or more logical addresses of corresponding logical unit memory areas; and the storage controller controls the flash memory module based on: a use degree, wherein the use degree is a total number of the one or more logical addresses that are associated with the physical unit memory area; and a duplication degree, wherein the duplication degree is a number of the one or more logical addresses associated with the physical unit memory area that are valid.

2. The storage device of claim 1, wherein: the prescribed management information is stored in the flash memory modules; and the storage controller is configured to monitor the use degree and the duplication degree for each of the flash memory modules and to control each of the flash memory modules separately.

3. The storage device of claim 1, wherein: the storage controller is configured to perform deduplication processing for eliminating duplicated data across the flash memory modules, wherein the deduplication processing includes, for each of the flash memory modules, associating the physical unit memory area with the one or more logical addresses in the prescribed management information based on the use degree and the duplication degree.

4. The storage device of to claim 1, wherein the storage device stores information that indicates a number of physical unit memory areas in each of the flash memory modules that are unused, and wherein the storage controller is configured, for each of the flash memory modules, to calculate capacity of the physical unit memory area for storing data in the future based on the number of unused physical unit memory areas in the flash memory module and the duplication degree.

5. The storage device of claim 1, wherein the storage controller is configured, for each of the flash memory modules, to set the prescribed management information to indicate the associations between the physical unit memory area and the one or more logical addresses of corresponding logical unit memory areas based on the use degree and the duplication degree.

6. A method for use in a storage device that includes one or more flash memory modules and a storage controller that controls the flash memory modules, wherein, for each of the flash memory modules, the flash memory module includes a flash memory chip, wherein the flash memory chip includes a physical unit memory area for storing data, the flash memory module includes a controller that controls reading and writing of data from and into the flash memory chip, and prescribed management information stored in the storage device indicates associations between the physical unit memory area and one or more logical addresses of corresponding logical unit memory areas, the method comprising: the storage controller controlling the flash memory module, for each of the flash memory modules, based on: a use degree, wherein the use degree is a total number of the one or more logical addresses that are associated with the physical unit memory area; and a duplication degree, wherein the duplication degree is a number of the one or more logical addresses associated with the physical unit memory area that are valid.

7. The method of claim 6, wherein the prescribed management information is stored in the flash memory modules, the method further comprising: the storage controller monitoring the use degree and the duplication degree for each of the flash memory modules and controlling each of the flash memory modules separately.

8. The method of claim 6, further comprising: the storage controller performing deduplication processing for eliminating duplicated data across the flash memory modules, wherein the deduplication processing includes, for each of the flash memory modules, associating the physical unit memory area with the one or more logical addresses in the prescribed management information based on the use degree and the duplication degree.

9. The method of claim 6, wherein the storage device stores information that indicates a number of physical unit memory areas in each of the flash memory modules that are unused, the method further comprising: the storage controller calculating, for each of the flash memory modules, a capacity of the physical unit memory area for storing data in the future based on the number of unused physical unit memory areas in the flash memory module and the duplication degree.

10. The method of claim 6, further comprising: the storage controller setting, for each of the flash memory modules, the prescribed management information to indicate the associations between the physical unit memory area and the one or more logical addresses of corresponding logical unit memory areas based on the use degree and the duplication degree.

* * * * *